(12) United States Patent
Nagaya

(10) Patent No.: US 9,469,164 B2
(45) Date of Patent: Oct. 18, 2016

(54) ATTACHMENT STRUCTURE

(75) Inventor: Gou Nagaya, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 154 days.

(21) Appl. No.: 14/130,142

(22) PCT Filed: Jun. 28, 2012

(86) PCT No.: PCT/JP2012/066557
§ 371 (c)(1),
(2), (4) Date: Dec. 30, 2013

(87) PCT Pub. No.: WO2013/005639
PCT Pub. Date: Jan. 10, 2013

(65) Prior Publication Data
US 2014/0124636 A1    May 8, 2014

(30) Foreign Application Priority Data

Jul. 1, 2011 (JP) .................................. 2011-147458
Jul. 19, 2011 (JP) .................................. 2011-157737

(51) Int. Cl.
| | |
|---|---|
| B60C 23/00 | (2006.01) |
| B60C 19/00 | (2006.01) |
| B60C 23/04 | (2006.01) |
| B60C 23/20 | (2006.01) |
| B29D 30/00 | (2006.01) |

(52) U.S. Cl.
CPC ........... B60C 19/00 (2013.01); B29D 30/0061 (2013.01); B60C 23/0493 (2013.01); B29D 2030/0072 (2013.01); B60C 23/00 (2013.01); B60C 23/20 (2013.01)

(58) Field of Classification Search
CPC ................. B29D 30/0061; B29D 2030/0072; B60C 23/0493; B60C 19/00; B60C 19/0491; B60C 2019/004; B60C 23/00; B60C 23/20
See application file for complete search history.

(56) References Cited

U.S. PATENT DOCUMENTS

| | | | | |
|---|---|---|---|---|
| 852,716 | A * | 5/1907 | Hall | B29C 73/06 |
| | | | | 152/370 |
| 2,611,411 | A * | 9/1952 | Rawls | B29D 30/52 |
| | | | | 152/209.12 |
| 3,971,186 | A * | 7/1976 | Havelka | F16B 2/14 |
| | | | | 403/374.4 |
| 3,996,085 | A | 12/1976 | Barnes et al. | |

(Continued)

FOREIGN PATENT DOCUMENTS

| | | |
|---|---|---|
| DE | 102007030238 A1 | 1/2009 |
| EP | 2203319 A2 | 7/2010 |

(Continued)

OTHER PUBLICATIONS

Machine generated English language translation of JP 2007-99048 (original document dated Apr. 2007).*

(Continued)

*Primary Examiner* — Martin Rogers
(74) *Attorney, Agent, or Firm* — Sughrue Mion, PLLC

(57) ABSTRACT

A mounting structure (200, 1200) is provided with a base (210) which has a base lower surface (211) adhered to the inner surface of a tire (100) and which also has a base upper surface (212) provided on the reverse side of the base lower surface (211). The base lower surface (211) has, before the base (210) is adhered to the inner surface of the tire (100), a shape recessed toward the center of the base (210).

5 Claims, 33 Drawing Sheets

TIRE CIRCUMFERENTIAL DIRECTION

(56) References Cited

U.S. PATENT DOCUMENTS

| | | | |
|---|---|---|---|
| 2005/0076982 A1* | 4/2005 | Metcalf | B60C 23/0493 152/152.1 |
| 2005/0132787 A1 | 6/2005 | Benedict et al. | |
| 2006/0237109 A1 | 10/2006 | Mangold et al. | |
| 2007/0175554 A1 | 8/2007 | Bertrand | |
| 2009/0084480 A1 | 4/2009 | Adamson et al. | |
| 2009/0173422 A1* | 7/2009 | Utsumi | B60C 23/0493 152/510 |
| 2009/0277549 A1* | 11/2009 | Tanno | B60C 19/002 152/157 |
| 2010/0276043 A1 | 11/2010 | Battocchio et al. | |
| 2010/0291345 A1* | 11/2010 | Cubizolle | B60C 23/0493 428/138 |

FOREIGN PATENT DOCUMENTS

| | | | | |
|---|---|---|---|---|
| JP | 51135005 A | | 11/1976 | |
| JP | 10-186289 | * | 7/1998 | G02C 7/00 |
| JP | 2002030729 A | | 1/2002 | |
| JP | 2004-299535 | * | 10/2004 | B60C 23/04 |
| JP | 2005-178753 A | | 7/2005 | |
| JP | 2006507495 A | | 3/2006 | |
| JP | 3123096 U | | 7/2006 | |
| JP | 2007-055347 A | | 3/2007 | |
| JP | 2007-99048 | * | 4/2007 | B60C 19/00 |
| JP | 2007-176479 A | | 7/2007 | |
| JP | 2008519732 A | | 6/2008 | |
| JP | 2008-230411 | * | 10/2008 | B60C 19/00 |
| JP | 2009-298327 | * | 12/2009 | B60C 19/00 |
| JP | 2010219415 A | | 9/2010 | |
| JP | 2011-500443 A | | 1/2011 | |
| JP | 2011-020557 A | | 2/2011 | |
| WO | 2005035278 A2 | | 4/2005 | |

OTHER PUBLICATIONS

Machine generated English language translation of JP 2004-299535 (original document dated Oct. 2004).*
Machine generated English language translation of JP 2009-298327 (original document dated Dec. 2009).*
Machine generated English language translation of JP 10-186289 (original document dated Jul. 1998).*
Machine generated English language translation of JP 2008-230411 (original document dated Oct. 2008).*
Communication dated Dec. 1, 2014 from the European Patent Office in counterpart application No. 12807586.8.
International Search Report of PCT/JP2012/066557 dated Sep. 11, 2012.
Written Opinion of PCT/JP2012/066557 dated Sep. 11, 2012.
Communication dated Feb. 23, 2016 issued by the Japanese Patent Office in counterpart application No. 2012-145236.

* cited by examiner

TIRE CIRCUMFERENTIAL DIRECTION

TIRE WIDTHWISE DIRECTION

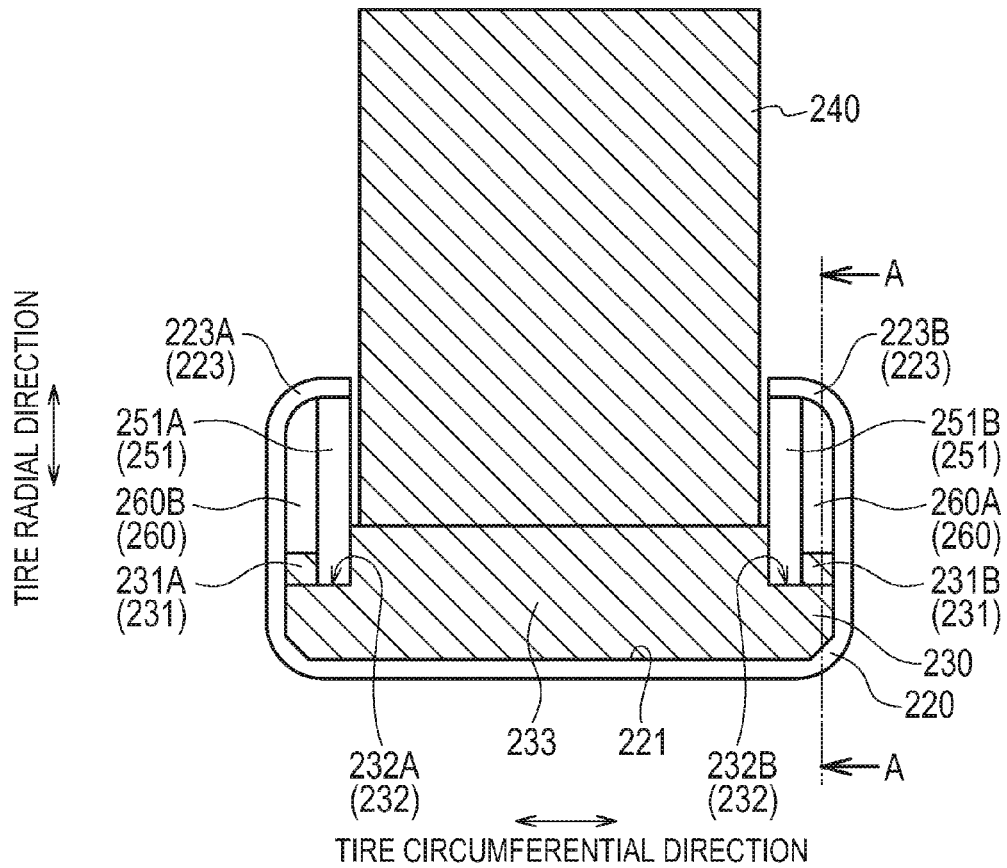
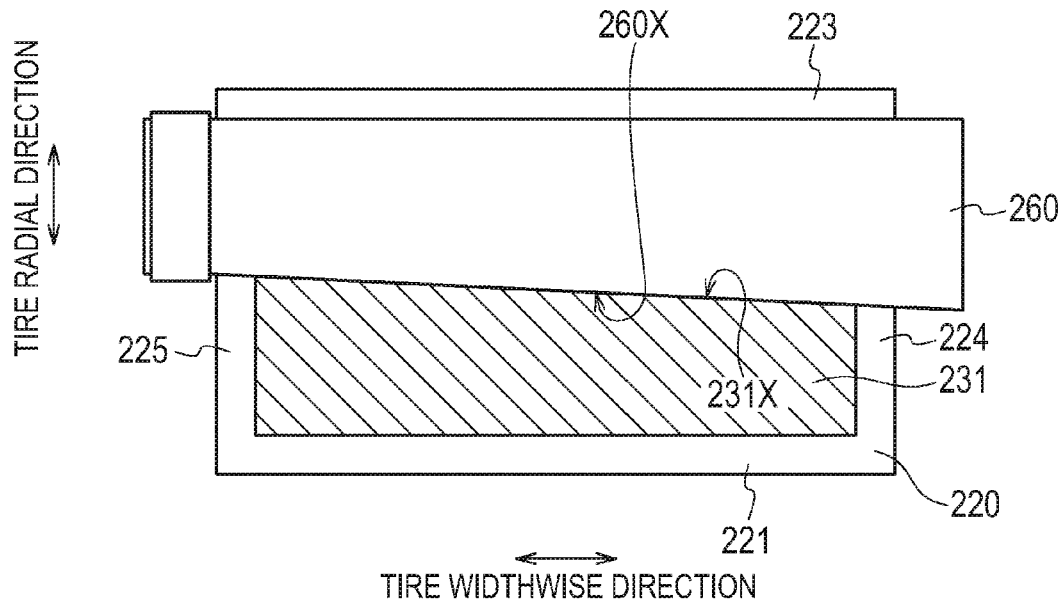

TIRE CIRCUMFERENTIAL DIRECTION

TIRE WIDTHWISE DIRECTION

FIG. 44
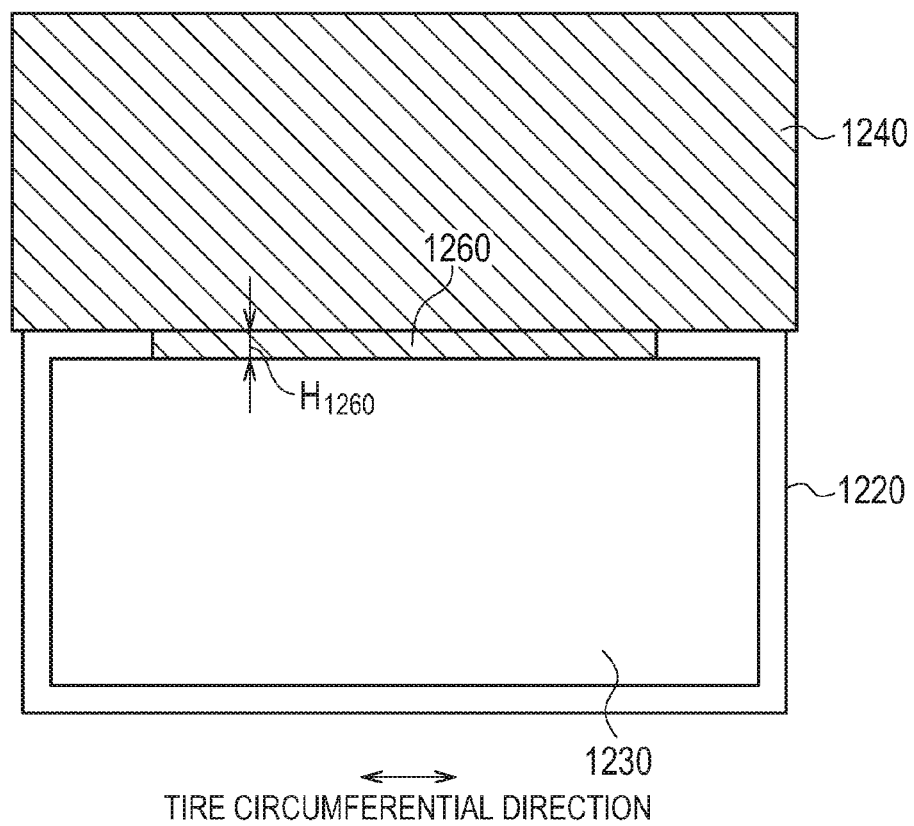
TIRE CIRCUMFERENTIAL DIRECTION
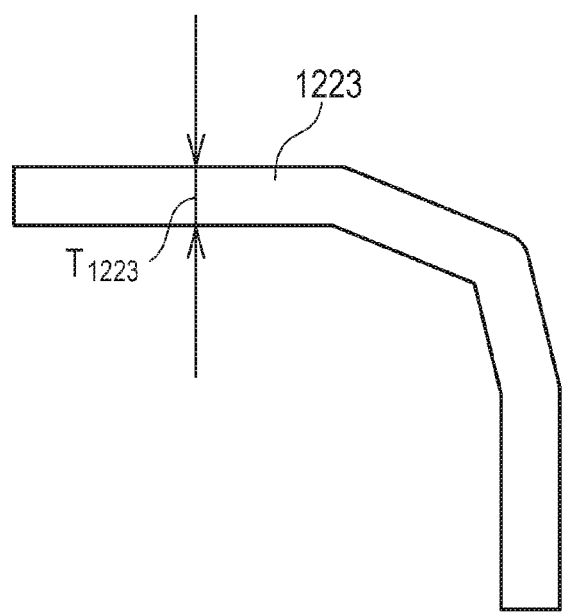

ATTACHMENT STRUCTURE

CROSS REFERENCE TO RELATED APPLICATIONS

This is a National Stage of International Application No. PCT/JP2012/066557 filed Jun. 28, 2012, claiming priority based on Japanese Patent Application Nos. 2011-147458 filed Jul. 1, 2011 and 2011-157737 filed Jul. 19, 2011, the contents of all of which are incorporated herein by reference in their entirety.

TECHNICAL FIELD

The present invention relates to an attachment structure that attaches a function component having a function of detecting a state of a tire to an inner surface of a tire.

BACKGROUND ART

Conventionally, it is known a tire provided with a pair of bead cores, a carcass layer, having a toroidal shape, over an interval between the pair of bead cores, a belt layer placed adjacently to the carcass layer, and a rubber layer that covers the bead cores, the carcass layer, and the belt layer.

The tire includes a bead unit having a bead core, a tread unit having a tire tread surface, a sidewall unit that forms a side surface of the tire, and a shoulder unit that is arranged over an interval between the side wall unit and the tread unit.

Further, a function component attached to a rubber layer (inner liner) configuring an inner surface of a tire is also known. The function component is a sensor module that measures a temperature, a pressure, etc., of the interior of the tire, for example. Generally, the function component is attached to the inner liner by a rubber patch, for example (for example, Patent Literature 1),

CITATION LIST

Patent Literature

[PTL 1]
Japanese Patent Application Publication No. 2007-055347

SUMMARY OF INVENTION

Between a state where the tire comes into contact with a road surface (grounding state) and a state where the tire does not come into contact with the road surface (non-grounding state), the shape of the inner liner differs. That is, in the grounding state, the inner liner is of flat shape, and in the non-grounding state, the inner liner is of arc shape.

In order to accommodate a deformation of such an inner liner, it is considered using relatively soft rubber as a material configuring rubber patch or the like. However, when a relatively soft rubber is used, the durability is decreased.

Thus, the bonding strength, between the attachment structure and the inner surface of a tire, for attaching the function component to the inner surface of a tire, is very important.

Therefore, the present invention has been achieved in order to solve the above-described problem, and an object thereof is to provide an attachment structure that enables restraining of detachment from an inner surface of a tire.

An attachment structure according to a first feature attaches a function component having a function of detecting a state of a tire to an inner surface of the tire. The attachment structure comprises: a pedestal formed of an elastic member, and including a pedestal lower surface bonded to the inner surface of the tire, and a pedestal upper surface arranged opposite the pedestal lower surface. The pedestal lower surface has a shape recessed toward a center of the pedestal in a cross section along a tire circumferential direction, in a state before the pedestal is bonded to the inner surface of the tire.

In the first feature, the pedestal lower surface deforms to a shape running along the inner surface of the tire in the cross section along the tire circumferential direction, in a state after the pedestal is bonded to the inner surface of the tire.

In the first feature, a difference between a center portion of the pedestal lower surface and an end of the pedestal lower surface is equal to or more than 1 mm.

In the first feature, the pedestal includes a pedestal inclined surface that continues from an end of the pedestal lower surface in the tire circumferential direction to an end of the pedestal upper surface in the tire circumferential direction. The pedestal inclined surface has a shape recessed toward a center of the pedestal in a tire circumferential direction, in a state before the pedestal is bonded to the inner surface of the tire.

In the first feature, the pedestal inclined surface has a depressed portion recessed with a curvature of a curvature radius R toward a center of the pedestal in the tire circumferential direction, in a state after the pedestal is bonded to the inner surface of the tire. In a cross section along the tire circumferential direction, a denotes a point farthest from an inner surface of the tire, in the depressed portion; b denotes a point at which to contact with the inner surface of the tire, in the depressed portion; c denotes an intersection point that intersects with a perpendicular line that extends down from the a to the pedestal lower surface, in the pedestal lower surface; ac denotes a line segment that links the a and the c; bc denotes a line segment that links the b and the c; A denotes a shorter length, out of the ac and the bc; and B denotes a longer length, out of the ac and the bc. The R satisfies a relationship of $(A^2+B^2)/(2\times A) < R < (A^2+B^2)^{0.5}$, when the A and the B satisfy a condition of $\frac{1}{3}^{0.5} \times B < A < B$.

In the first feature, in a cross section along the tire circumferential direction, the R satisfies a relationship $(A^2+B^2)/(2\times A) < R$, when the A and the B satisfy a condition $A < \frac{1}{3}^{0.5} \times B$.

In the first feature, in a state before the pedestal is bonded to the inner surface of the tire, the pedestal lower surface comprises: a flat portion that is located opposite the pedestal upper surface and that has a flat shape in a cross section along the tire circumferential direction; and a curved portion that is located from an end of the flat portion to an end of the pedestal lower surface and that has an arch shape with a predetermined curvature in a cross section along a tire circumferential direction, and the flat portion and the curved portion are linked smoothly.

In the first feature, the attachment structure further comprising: a frame having a bottom plate formed of a member having a predetermined rigidity and having a frame lower surface placed on the pedestal upper surface and a frame upper surface arranged opposite the frame lower surface; a base which is formed of a member having a predetermined rigidity and on which the function component is mounted; and a fitting member for fixing the base to the frame. The frame upper surface is defined by a first direction and a second direction crossing the first direction. The frame includes, on the frame upper surface, a pair of first-direction lateral walls extending along the first direction and standing upright in a vertical direction relative to the frame upper surface. The base is placed on the frame upper surface so as to be fit between the pair of first-direction lateral walls. The pair of first-direction lateral walls of the frame include a lateral wall engagement piece that bends toward the other one of the first-direction lateral walls, as a tip of the vertical direction relative to the frame upper surface. The base includes, at both sides in the second direction, a pair of lateral walls extending along the first direction and standing upright in a vertical direction relative to the frame upper surface. The fitting member is placed to be fit between the lateral wall of the base placed on the frame upper surface and the lateral wall engagement piece of the frame. The lateral wall of the base has an inclination relative to the first direction, and has the upper surface contacting the fitting member. The fitting member has an inclination to run along the upper surface of the lateral wall, and has a lower surface contacting the upper surface of the lateral wall.

The attachment structure according to a second feature in the first feature further comprising: a frame having a bottom plate formed of a member having a predetermined rigidity and having a frame lower surface placed on the pedestal upper surface and a frame upper surface arranged opposite the frame lower surface; and a base which is formed of a member having a predetermined rigidity and on which the function component is mounted. The frame upper surface is defined by a first direction and a second direction crossing the first direction. The frame includes, on the frame upper surface, a pair of first-direction lateral walls extending along the first direction and standing upright in a vertical direction relative to the frame upper surface. The base is placed on the frame upper surface so as to be fit between the pair of first-direction lateral walls. The pedestal includes a pair of protrusions extending along the second direction and arranged with an interval in the first direction. The frame is placed to be fit between the pair of protrusions in the first direction.

In the second feature, the base includes a pair of groove portions extending along the second direction and arranged with an interval in the first direction. The base is placed in the pedestal so that the pair of protrusions are fit to the pair of groove portions.

In the second feature, in a vertical direction relative to the frame upper surface, a depth of the pair of groove portions is smaller than a height of the pair of protrusions.

In the second feature, a neck is arranged between the function component and the base. The pair of first-direction lateral walls include a lateral wall engagement piece that bends toward the other one of the first-direction lateral walls, as a tip in the vertical direction relative to the frame upper surface. In an orthogonal direction relative to the first direction, a size of the neck is smaller than sizes of the function component and the base. The lateral wall engagement piece is curved at a location of the neck and is placed to be fit between the function component and the base.

According to the present invention, it is possible to provide an attachment structure that enables restraining of detachment from an inner surface of a tire. Further, according to the present invention, it is possible to provide an attachment structure that enables attachment of a function component to the inner surface of a tire so that it is possible to detect a high frequency vibration, for example.

BRIEF DESCRIPTION OF DRAWINGS

FIG. 27 is a diagram describing assembly of the attachment structure 200 according to the third modification.

FIG. 28 is a diagram describing assembly of the attachment structure 200 according to the third modification.

FIG. 44 is a diagram illustrating the frame 1220 according to the second modification.

DESCRIPTION OF EMBODIMENTS

Hereinafter, an attachment structure according to an embodiment of the present invention will be described with reference to drawings. In addition, in the description of the drawings below, identical or similar symbols are assigned to identical or similar portions.

It is appreciated that the drawings are schematically shown and the ratio and the like of each dimension are different from the real ones. Accordingly, specific dimensions should be determined in consideration of the explanation below. Of course, among the drawings, the dimensional relationship and the ratio may be different.

[Overview of First Embodiment]

An attachment structure according to the first embodiment attaches a function component having a function of detecting a state of a tire to an inner surface of the tire. The attachment structure comprises: a pedestal formed of an elastic member, and including a pedestal lower surface bonded to the inner surface of the tire, and a pedestal upper surface arranged opposite the pedestal lower surface. The pedestal lower surface has a shape recessed toward a center of the pedestal in a cross section along a tire circumferential direction, in a state before the pedestal is bonded to the inner surface of the tire.

In a first embodiment, the pedestal lower surface has the shape recessed toward the center of the pedestal in the cross section along the tire circumferential direction. Therefore, when the pedestal is bonded to the inner surface of the tire, the end of the pedestal lower surface comes into contact with the inner surface of the tire before the center portion thereof comes into contact with the inner surface of the tire. Therefore, even when the strength for pressing the pedestal lower surface against the inner surface of the tire is applied only to the center of the pedestal, it is possible to improve the bonding strength at the end of the pedestal lower surface that is likely to act as a point from which detachment starts.

It should be noted that this eliminates to employ a complicated device, for example, to make the strength for pressing the pedestal lower surface against the inner surface of the tire equal across the pedestal lower surface.

[First Embodiment]

(Configuration of Tire)

Figure 1:
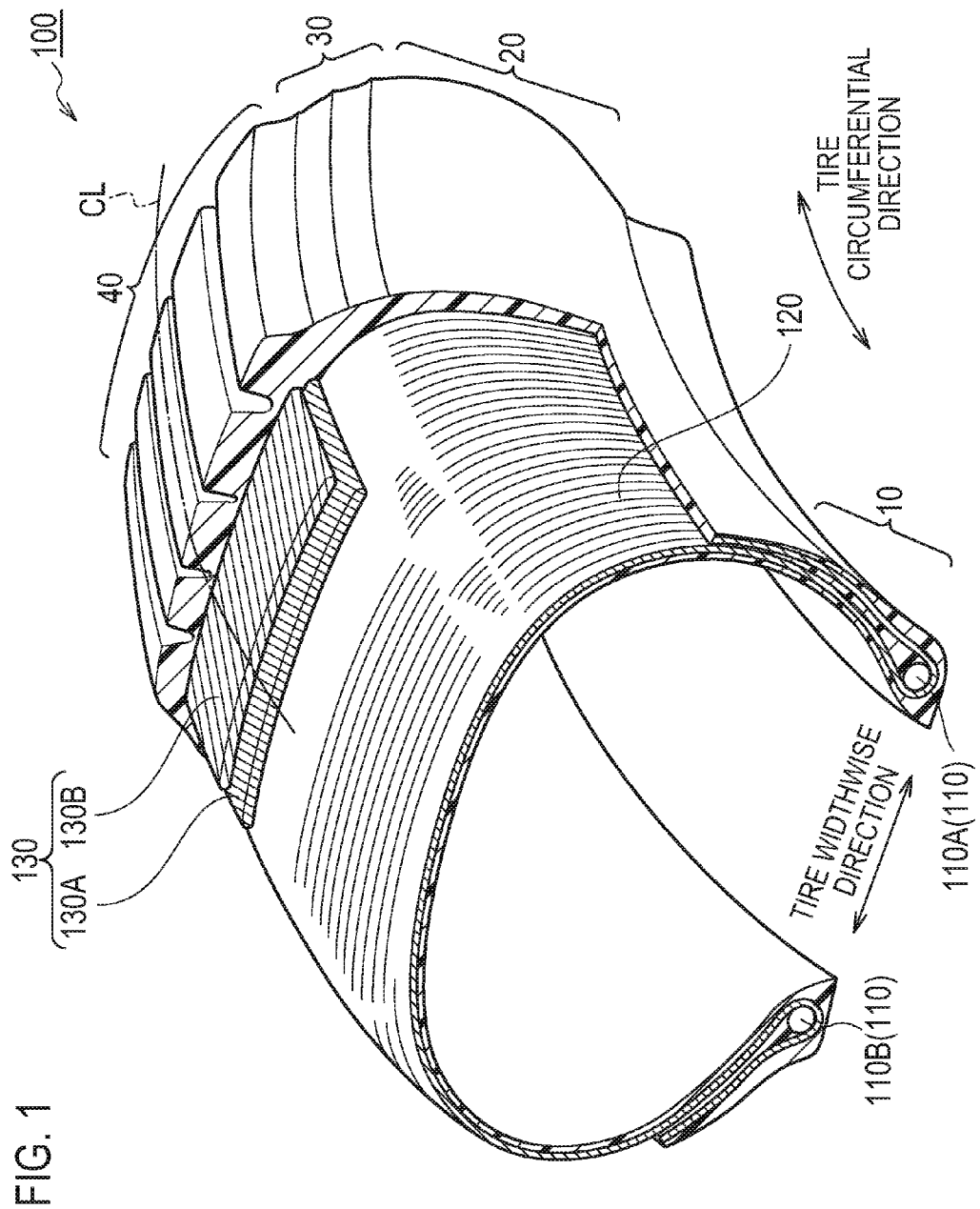
FIG. 1 is a diagram illustrating a tire 100 according to a first embodiment.
Figure 2:
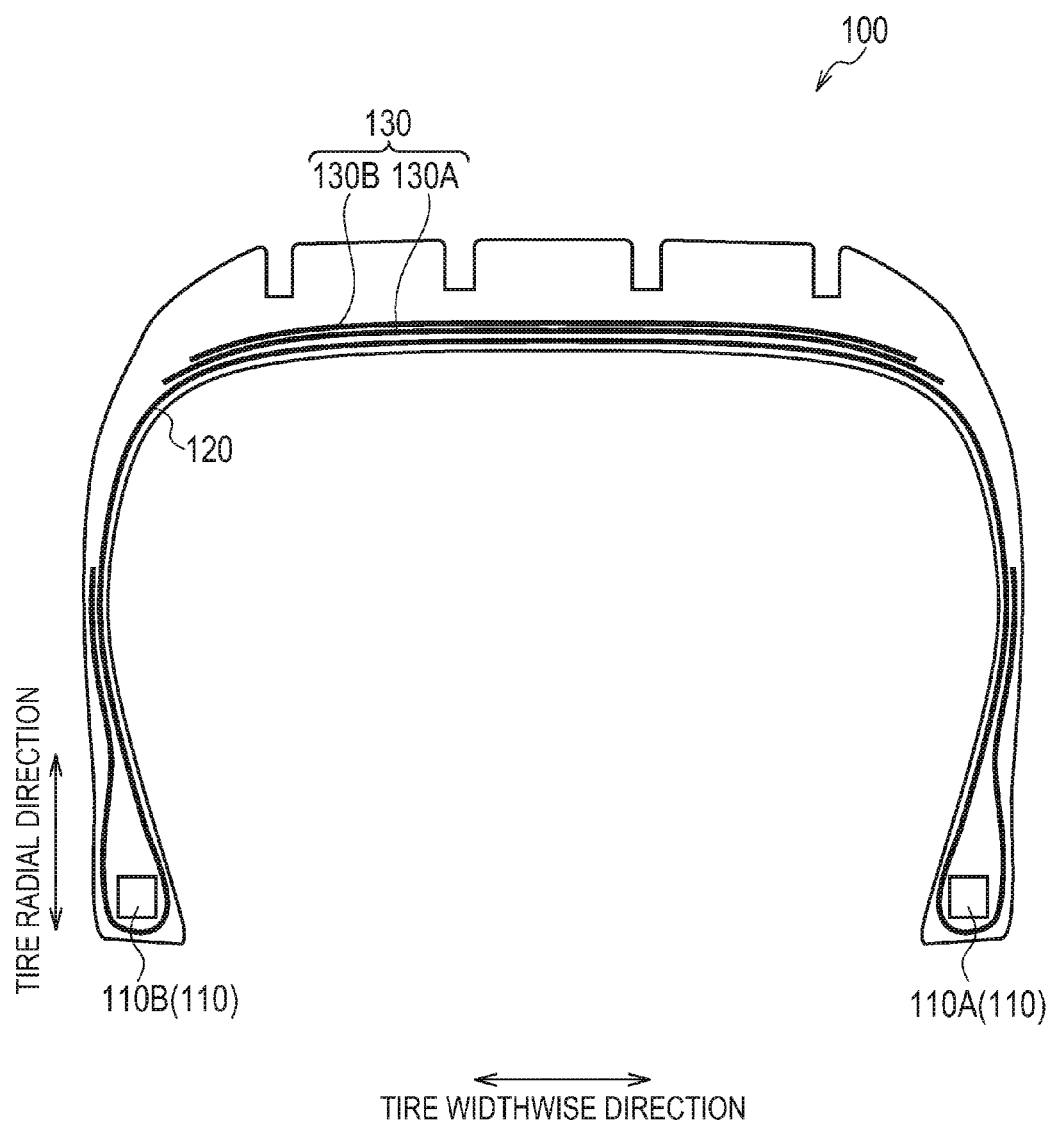
FIG. 2 is a diagram illustrating the tire 100 according to the first embodiment.

The configuration of the tire according to the first embodiment will be described, below. FIG. 1 and FIG. 2 are diagrams each illustrating a tire 100 according to the first embodiment.

Firstly, as shown in FIG. 1, the tire 100 includes a bead unit 10, a sidewall unit 20, a shoulder unit 30, and a tread unit 40.

The bead unit 10 is arranged at the innermost side, in a tire radial direction, out of regions configuring the tire 100. The bead unit 10 is arranged continuously along the tire circumferential direction. The bead unit 10 is a region for fixing the tire 100 to a rim. It is noted that the bead unit 10 is covered with rubber.

The sidewall unit 20 is arranged at an outer side than the bead unit 10, in the tire radial direction, out of regions configuring the tire 100. The sidewall unit 20 is arranged continuously along the tire circumferential direction. The sidewall unit 20 configures a side surface of the tire 100. It is noted that the sidewall unit 20 is covered with rubber.

The shoulder unit 30 is arranged over an interval between the sidewall unit 20 and the tread unit 40, out of the regions configuring the tire 100. The shoulder unit 30 is arranged continuously along the tire circumferential direction. It is noted that the shoulder unit 30 is covered with rubber.

The tread unit 40 is a region configuring a tire tread surface (grounding surface) that comes into contact with a road surface, out of the regions configuring the tire 100. The tread unit 40 is arranged continuously along the tire circumferential direction. On the tire tread surface of the tread unit 40, a tread pattern is arranged which is formed by a groove extending along the tire circumferential direction (circumferential groove) and a groove extending along a tire widthwise direction (widthwise groove), for example.

Secondly, the tire 100 includes a bead core 110, a carcass layer 120, and a belt layer 130, as shown in FIG. 1 and FIG. 2.

The bead core 110 includes a bead core 110A and a bead core 110B, and configures the bead unit 10. The bead core 110 is of ring shape, and formed of a bead wire (not illustrated).

The carcass layer 120 is of toroidal shape over an interval between the bead core 110A and the bead core 110B. The carcass layer 120 is configured, for example, by a plurality of carcass cords (not illustrated) extending along the tire radial direction (or the tire widthwise direction). The carcass layer 120 is folded back toward outside in the tire widthwise direction at the bead core 110.

The belt layer 130 includes a belt layer 130A and a belt layer 130B, and configures the tread unit 40. The belt layer 130 is placed outside in the tire radial direction relative to the carcass layer 120. The belt layer 130 includes a configuration in which a belt cord is covered with rubber. The belt cord arranged in the belt layer 130A may cross the belt cord arranged in the belt layer 130B.

(Configuration of Attachment Structure)

Figure 3:
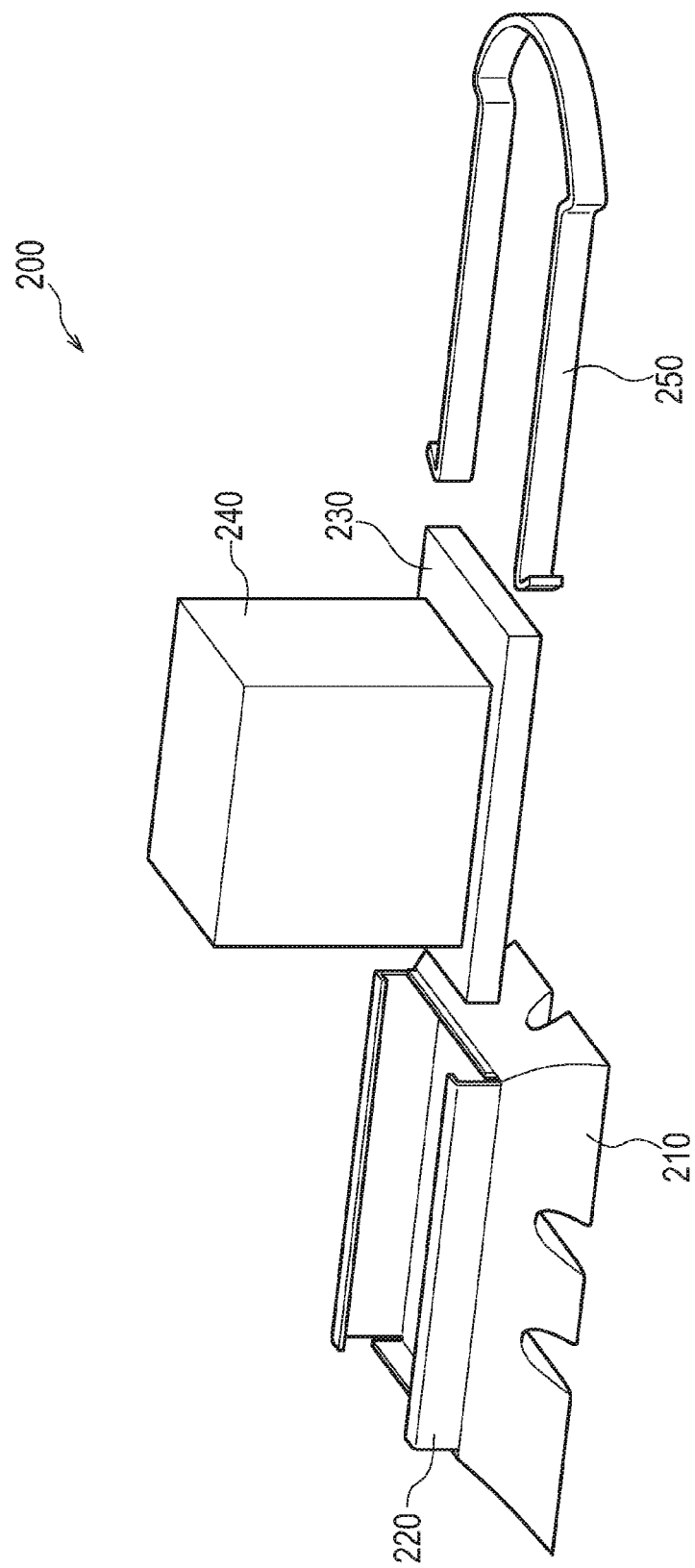
FIG. 3 is a diagram illustrating an attachment structure 200 according to the first embodiment.

The configuration of the attachment structure according to the first embodiment will be described, below. FIG. 3 is a diagram illustrating an attachment structure 200 according to the first embodiment. In this case, it should be noted that the attachment structure 200 is bonded to the inner surface of the tire 100. In particular, the attachment structure 200 is bonded to the inner surface, of the tire 100, extending along the tire circumferential direction, that is, the inner surface of the tire 100 configuring the tread unit 40.

As shown in FIG. 3, the attachment structure 200 includes a pedestal 210, a frame 220, a base 230, a function component 240, and an insertion piece 250.

The pedestal 210 is formed of an elastic member (elastomer). For example, the pedestal 210 is formed of natural rubber or synthetic rubber. The pedestal 210 includes a pedestal lower surface bonded to the inner surface of the tire 100 and a pedestal upper surface arranged opposite the pedestal lower surface. For example, the pedestal 210 is bonded to the inner surface of the tire 100 by cure adhesion. On the pedestal upper surface of the pedestal 210, the function component 240 is arranged via the frame 220 and the base 230.

It is noted that the Young's modulus of the elastic member configuring the pedestal 210 preferably is equal to or less than 30 MPa. When the pedestal 210 is bonded to the inner surface of the tire 100 having a small outer shape, a change in curvature radius of the tread unit 40 is large, and thus, the Young's modulus of the elastic member configuring the pedestal 210 preferably is equal to or more than 1 MPa and equal to or less than 7 MPa.

The frame 220 is formed of a member having a predetermined rigidity. The frame 220 is placed on the pedestal upper surface of the pedestal 210. For example, the surface of the frame 220 is brass-plated, the pedestal 210 includes cobalt, and the frame 220 is bonded to the pedestal 210 by cure adhesion.

In the first embodiment, the frame 220 is of box shape housing the base 230. It is noted that the frame 220 will be described in detail later (see FIG. 4 to FIG. 6).

The base 230 is formed of a member having a predetermined rigidity. On the base 230, the function component 240 is loaded. In the first embodiment, the base 230 is of substantially rectangular parallelepiped shape, and housed in the frame 220.

The function component 240 includes a function of detecting a state of the tire 100. The examples of the function component 240 include a pressure sensor for detecting an inner pressure of the tire 100, a temperature sensor for detecting an inner temperature of the tire 100, and an accelerometer for detecting a rotation speed of the tire 100.

The insertion piece 250 is formed of a member having a predetermined rigidity. The insertion piece 250 is inserted into the frame 220, and regulates a movement of the base 230 housed in the frame 220. In the first embodiment, the insertion piece 250 is of U-letter shape, and restricts a movement of the base 230 in the vertical direction relative to the inner surface of the tire 100. It is noted that the insertion piece 250 will be described in detail later (see FIG. 7 and FIG. 8).

(Configuration of Frame)

Figure 4:
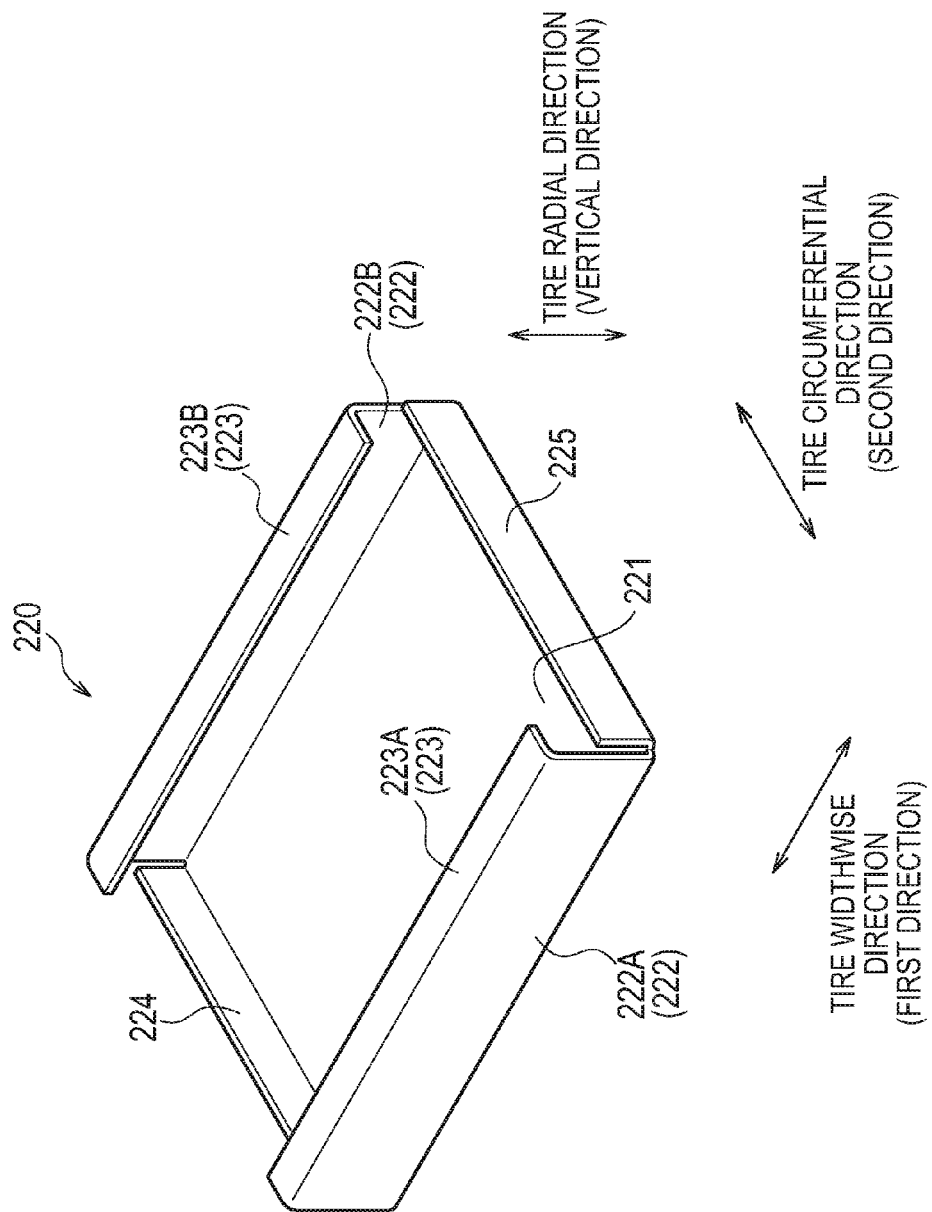
FIG. 4 is a diagram illustrating a frame 220 according to the first embodiment.

The configuration of the frame according to the first embodiment will be described, below. FIG. 4 is a diagram illustrating a frame 220 according to the first embodiment.

As shown in FIG. 4, the frame 220 includes a bottom plate 221, a pair of first wall bodies 222 (a first wall body 222A and a first wall body 222B), a pair of lateral wall engagement pieces 223 (a lateral wall engagement piece 223A and a lateral wall engagement piece 223B), a second wall body 224, and a second wall body 225.

The bottom plate 221 includes a frame lower surface placed on the pedestal upper surface and a frame upper surface arranged opposite the frame lower surface. The frame upper surface is defined by a first direction and a second direction crossing the first direction. On the frame upper surface of the bottom plate 221, the base 230 is loaded. It is noted that in the first embodiment, the bottom plate 221 is of plate shape, and includes a frame upper surface of rectangular shape.

The first wall body 222A and the first wall body 222B are arranged on the bottom plate 221. The first wall body 222A and the first wall body 222B are of shape that stands upright in the vertical direction relative to the bottom plate 221. The first wall body 222A and the first wall body 222B extend along the first direction. The first wall body 222A and the first wall body 222B are arranged with an interval in the second direction crossing the first direction.

In the first embodiment, the first wall body 222A is configured such that the tip in the vertical direction relative to the bottom plate 221 is the lateral wall engagement piece 223A that bends toward the first wall body 222B side in the second direction. The lateral wall engagement piece 223A extends along the first direction. Similarly, the first wall body 222B is configured such that the tip in the vertical direction relative to the bottom plate 221 is the lateral wall engagement piece 223B that bends toward the first wall body 222A side in the second direction. The lateral wall engagement piece 223B extends along the first direction.

The second wall body 224 is arranged on the bottom plate 221. The second wall body 224 is of shape that stands upright in the vertical direction relative to the bottom plate 221. The second wall body 224 extends along the second direction. It is noted that in the first embodiment, the second wall body 224 is of plate shape, and is arranged at one end of the bottom plate 221 in the first direction.

The second wall body 225 is arranged on the bottom plate 221. The second wall body 225 is of shape that stands upright in the vertical direction relative to the bottom plate 221. The second wall body 225 extends along the second direction. In the first embodiment, the second wall body 225 is of plate shape, and is arranged at the other end of the bottom plate 221 in the first direction.

It is noted that the second wall body 224 and the second wall body 225 are arranged with an interval in the first direction. In the first embodiment, in order that the base 230 is inserted along the first direction, in the vertical direction, at least one of heights of the second wall body 224 and the second wall body 225 preferably is lower than the height of the first wall body 220.

Thus, in the first embodiment, the bottom plate 221, the first wall body 222, the second wall body 224, and the second wall body 225 configure a box shape.

In the first embodiment, an example where the attachment structure 200 is bonded to the tire 100, where the first direction is the tire widthwise direction, will be described. To clarify the description, the first direction is called the tire widthwise direction, the second direction is called the tire circumferential direction, and the vertical direction is called the tire radial direction, below.

(Dimension of Frame)

Figure 5:
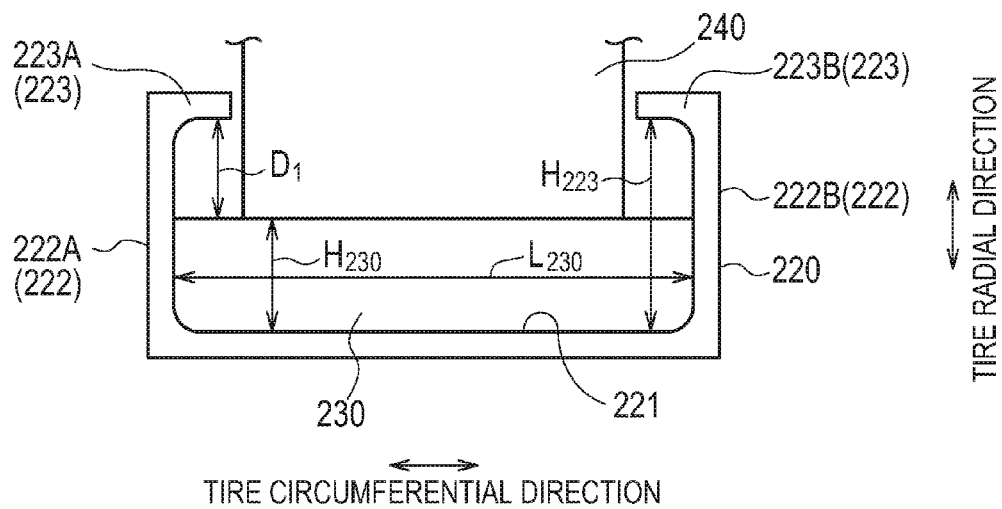
FIG. 5 is a diagram illustrating the frame 220 according to the first embodiment.
Figure 6:
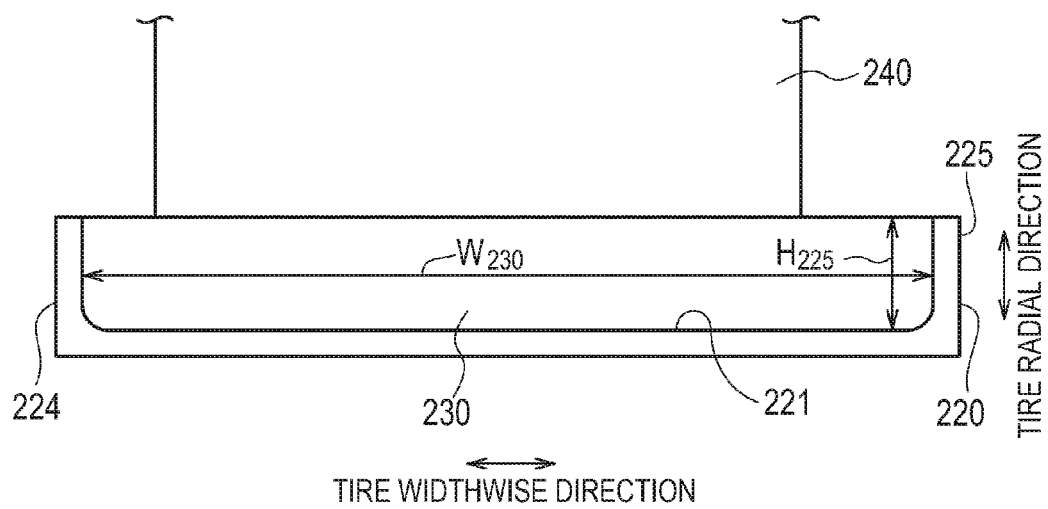
FIG. 6 is a diagram illustrating the frame 220 according to the first embodiment.

The dimension of the frame according to the first embodiment will be described, below. FIG. 5 and FIG. 6 are diagrams each illustrating the frame 220 according to the first embodiment. It is noted that FIG. 5 and FIG. 6 illustrates a state where the base 230 is housed in the frame 220.

As shown in FIG. 5, in the tire radial direction, $H_{223}$ denotes the height from the frame upper surface of the frame 220 to the lateral wall engagement piece 223. In the tire radial direction, $H_{230}$ denotes the height of the base 230. $D_1$ is a difference between the height $H_{223}$ and the height $H_{230}$. In the tire circumferential direction, $L_{230}$ denotes the length of the base 230.

In the first embodiment, in the tire circumferential direction, an interval between a pair of first wall bodies 222 is equal to the length $L_{230}$ of the base 230. Therefore, the pair of first wall bodies 222 restrain the movement of the base 230 in the tire circumferential direction. In other words, the base 230 is placed on the frame upper surface of the frame 220 so as to be fit between the pair of first wall bodies 222.

It is noted that as described below, in the tire radial direction, the difference $D_1$ is equal to the height of a pair of arm units arranged in the insertion piece 250. Therefore, the pair of arm units restrict the movement of the base 230 in the tire radial direction.

As shown in FIG. 6, in the tire radial direction, $H_{225}$ denotes the height of the second wall body 224 and the second wall body 225. In the tire widthwise direction, $W_{230}$ denotes the width of the base 230.

In the first embodiment, in the tire widthwise direction, an interval between the second wall body 224 and the second wall body 225 is equal to the width $W_{230}$ of the base 230. Therefore, the second wall body 224 and the second wall body 225 restrain the movement of the base 230 in the tire widthwise direction.

In the first embodiment, the difference between the height $H_{223}$ and the height $H_{225}$ preferably is larger than the height $H_{230}$ of the base 230. This facilitates the insertion of the base 230 within the frame 220 along the tire widthwise direction.

(Configuration of Insertion Piece)

Figure 7:
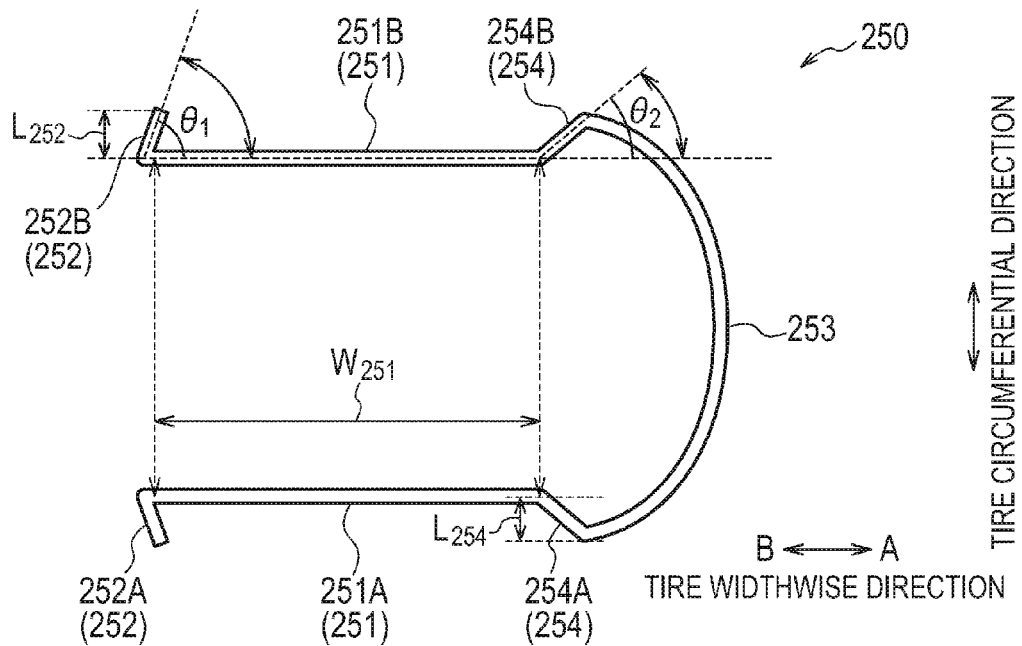
FIG. 7 is a diagram illustrating an insertion piece 250 according to the first embodiment.
Figure 8:
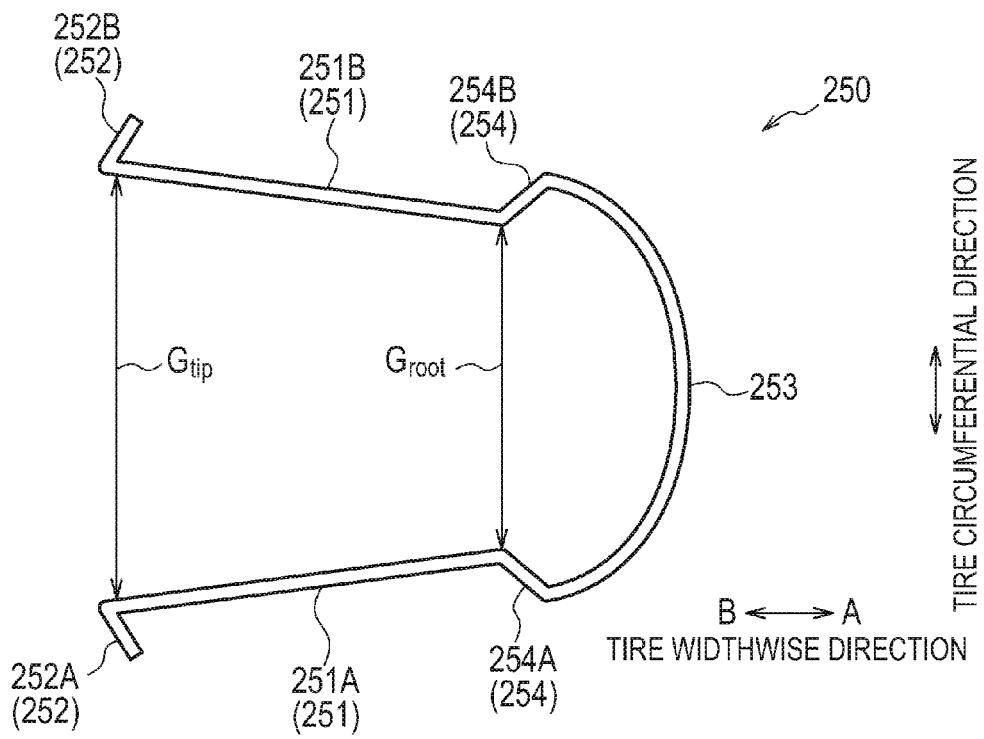
FIG. 8 is a diagram illustrating the insertion piece 250 according to the first embodiment.

The configuration of the insertion piece according to the first embodiment will be described, below. FIG. 7 and FIG. 8 are diagrams each illustrating the insertion piece 250 according to the first embodiment. It is noted that FIG. 7 illustrates a state after the insertion piece 250 is attached to the frame 220, and FIG. 8 illustrates a state before the insertion piece 250 is attached to the frame 220.

As shown in FIG. 7 and FIG. 8, the insertion piece 250 includes a pair of arm units 251 (an arm unit 251A and an arm unit 251B), a pair of tip folded pieces 252 (a tip folded piece 252A and a tip folded piece 252B), a linkage unit 253, and a pair of projection portions 254 (a projection portion 254A and a projection portion 254B).

The arm unit 251A and the arm unit 251B extend along the tire widthwise direction. Further, the arm unit 251A and the arm unit 251B have flexibility in the tire circumferential direction. For example, the arm unit 251A and the arm unit 251B are of flat plate shape of which the thickness in the tire circumferential direction is smaller than the thickness in the tire radial direction.

The tip of the arm unit 251A configures the tip folded piece 252A that bends toward outside the insertion piece 250 in the tire circumferential direction. Similarly, the tip of the arm unit 251B configures the tip folded piece 252B that bends toward outside the insertion piece 250 in the tire circumferential direction.

An angle $\theta_1$ formed between the main body of the arm unit 251 and the tip folded piece 252 preferably is an acute angle. That is, the tip (tip folded piece 252) of the arm unit 251 is folded back so that the angle $\theta_1$ is acute.

The tip folded piece 252 is configured to be caught in the first wall body 222 after the insertion piece 250 is attached to the frame 220. That is, the tip folded piece 252 has a function of preventing the insertion piece 250 from being pulled out along the tire widthwise direction.

The tip folded piece 252 restrains the insertion piece 250 from being pulled out toward an A side in the tire widthwise direction after the insertion piece 250 is attached to the frame 220.

The linkage unit 253 is a region for linking roots of the arm unit 251A and the arm unit 251B. The linkage unit 253 includes the projection portion 254A that bends toward outside the insertion piece 250 in the tire circumferential direction from the root of the arm unit 251A. Similarly, the linkage unit 253 includes the projection portion 254B that bends toward outside the insertion piece 250 in the tire circumferential direction from the root of the arm unit 251B.

An angle $\theta_2$ formed between an extended line of the main body of the arm unit 251 and the projection portion 254 preferably is an acute angle. That is, a region (the projection portion 254) that continues to the root of the arm unit 251 is folded back so that the angle $\theta_2$ is acute.

The projection portion 254 has a function of preventing the insertion piece 250 from entering a B side in the tire widthwise direction after the insertion piece 250 is attached to the frame 220. On the other hand, it is possible to remove the tip folded piece 252 from being caught, by moving the insertion piece 250 to the B side in the tire widthwise direction, when the insertion piece 250 is removed from the frame 220.

In this case, $L_{252}$ denotes the length of the tip folded piece 252 in the tire circumferential direction. $L_{254}$ denotes the length of the projection portion 254 in the tire circumferential direction. The length $L_{252}$ preferably is equal to the length $L_{254}$. As a result, the insertion piece 250 becomes less likely to be pulled out of the frame 220.

Further, in the tire widthwise direction, $W_{251}$ denotes the length of the arm unit 251. The length $W_{251}$ of the arm unit 251 preferably is equal to the length of the first wall body 222 in the tire widthwise direction. As a result, the insertion piece 250 becomes less likely to be pulled out of the frame 220.

It is noted that as shown in FIG. 8, before the insertion piece 250 is attached to the frame 220, an interval $G_{tip}$ of the tips of the arm unit 251 preferably is larger than an interval $G_{root}$ of the roots of the arm unit 251. By the flexibility provided in the arm unit 251, the insertion piece 250 is less likely to be pulled out of the frame 220.

(Configuration of Pedestal)

Figure 9:
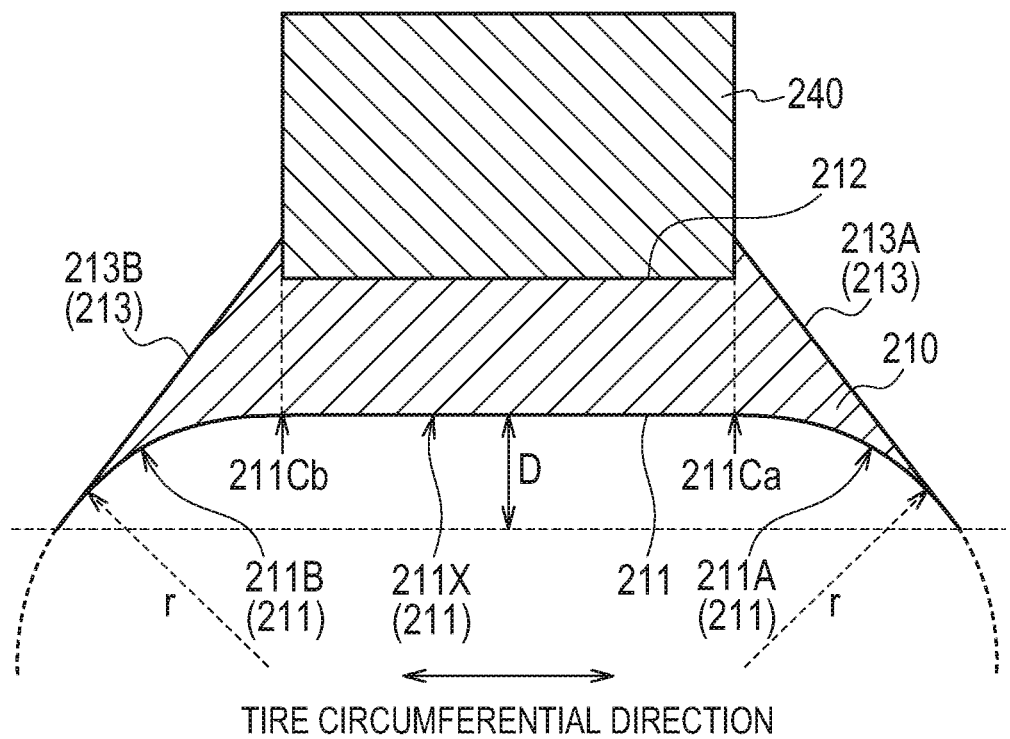
FIG. 9 is a diagram illustrating a pedestal 210 according to the first embodiment.

The configuration of the pedestal according to the first embodiment will be described, below. FIG. 9 is a diagram illustrating a pedestal 210 according to the first embodiment. It should be noted that in FIG. 9, the frame 220 and the base 230 are omitted. Further, FIG. 9 shows a state before the pedestal 210 is bonded to the inner surface of the tire 100.

As shown in FIG. 9, the pedestal 210 includes a pedestal lower surface 211 bonded to the inner surface of the tire 100, a pedestal upper surface 212 arranged opposite to the pedestal lower surface 211, and a pedestal inclined surface 213 (a pedestal inclined surface 213A and a pedestal inclined surface 213B) that continues from the end of the pedestal lower surface 211 in the tire circumferential direction to the end of the pedestal upper surface 212 in the tire circumferential direction.

The pedestal lower surface 211 has a shape recessed toward a center of the pedestal 210 in a cross section along the tire circumferential direction. In the pedestal lower surface 211, a difference D between a most recessed portion (center portion of the pedestal lower surface 211) and a least recessed portion (end of the pedestal lower surface 211) is equal to or more than 1 mm.

It is noted that in the first embodiment, the pedestal lower surface 211 has a shape recessed toward a center of the pedestal 210 in a cross section along the tire circumferential direction.

Further, in a state before the pedestal 210 is bonded to the inner surface of the tire 100, as shown in FIG. 9, the pedestal lower surface 211 includes a flat portion 211X that is located opposite to the pedestal upper surface 212 and that has a flat shape in a cross section along the tire circumferential direction; and curved portions 211A and 211B that are located in an interval from ends 211Ca and 211Cb of the flat portion 211X to the end of the pedestal lower surface 211 and that has an arch shape with a predetermined curvature radius r in the cross section along the tire circumferential direction. Specifically, the pedestal lower surface 211 includes the curved portion 211A in an interval from one end 211Ca of the flat portion 211X to one end of the pedestal lower surface 211, and the curved portion 211B in an interval from the other end 211Cb of the flat portion 211X to the other end of the pedestal lower surface 211.

Further, the flat portion 211X and the curved portions 211A and 211B are smoothly linked. Herein, smoothly link means that the surfaces are continued in flush. In other words, the flat portion 211 and the curved portions 211 are linked so that there are no undulations such as a step, on the surface. Specifically, the flat portion 211X and the curved portion 211A are smoothly connected at one end 211Ca of the flat portion 211X, and the flat portion 211X and the curved portion 211B are smoothly linked at the other end 211Cb of the flat portion 211X.

Herein, a state before the pedestal 210 is bonded to the inner surface of the tire 100, and a state after the pedestal 210 is bonded to the inner surface of the tire 100 will be described.

Figure 10:
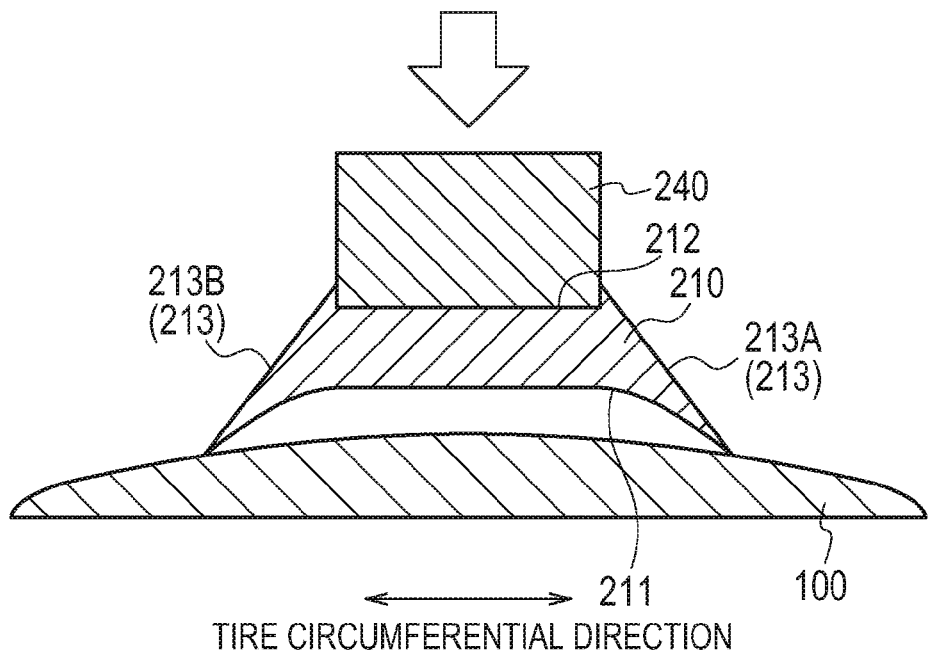
FIG. 10 is a diagram illustrating the pedestal 210 according to the first embodiment.

In the state before the pedestal 210 is bonded to the inner surface of the tire 100, as shown in FIG. 10, the pedestal lower surface 211 has a shape recessed toward the center of the pedestal 210, and thus, the end of the pedestal lower surface 211 comes into contact with the inner surface of the tire 100 before the center portion of the pedestal lower surface 211 comes into contact with the inner surface of the tire 100, in the tire circumferential direction. In such a state, the strength for pressing the pedestal 210 against the inner surface of the tire 100 is applied from above the center portion of the pedestal 210 in the tire circumferential direction.

Figure 11:
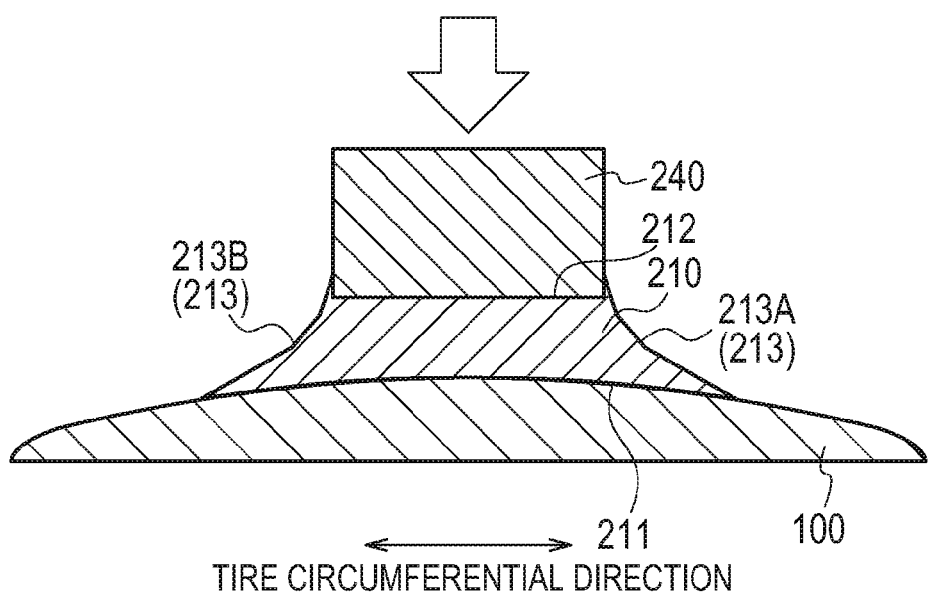
FIG. 11 is a diagram illustrating the pedestal 210 according to the first embodiment.

In the state after the pedestal 210 is bonded to the inner surface of the tire 100, as shown in FIG. 11, the elasticity of the elastic member configuring the pedestal 210 deforms the pedestal lower surface 211 to a shape running along the inner surface of the tire 100. Along therewith, the pedestal inclined surface 213 is deformed to a shape recessed toward a center of the pedestal 210 in the tire circumferential direction.

At this time, on the pedestal lower surface 211, the flat portion 211X of flat shape is located at the inner surface side of the tire 100 in the function component 240 which is a rigid body, and an air containing portion is less likely to occur, as a result of which it is possible to increase the bonding strength of the pedestal 210 against the inner surface of the tire 100. Further, the flat portion 211X and the curved portions 211A and 211B are linked smoothly, and thus, when the pedestal 210 is bonded to the inner surface of the tire 100, air present in a recessed portion of the pedestal lower surface 211 is less likely to remain therein because it is exhausted to outside. As a result, the absorption strength of the pedestal lower surface 211 is increased, and thus, the pedestal 210 is capable of improving the strength bonding with the inner surface of the tire 100.

Subsequently, in the state after the pedestal 210 is bonded to the inner surface of the tire 100, a preferable shape of the pedestal inclined surface 213 will be described with reference to FIG. 12.

Figure 12:
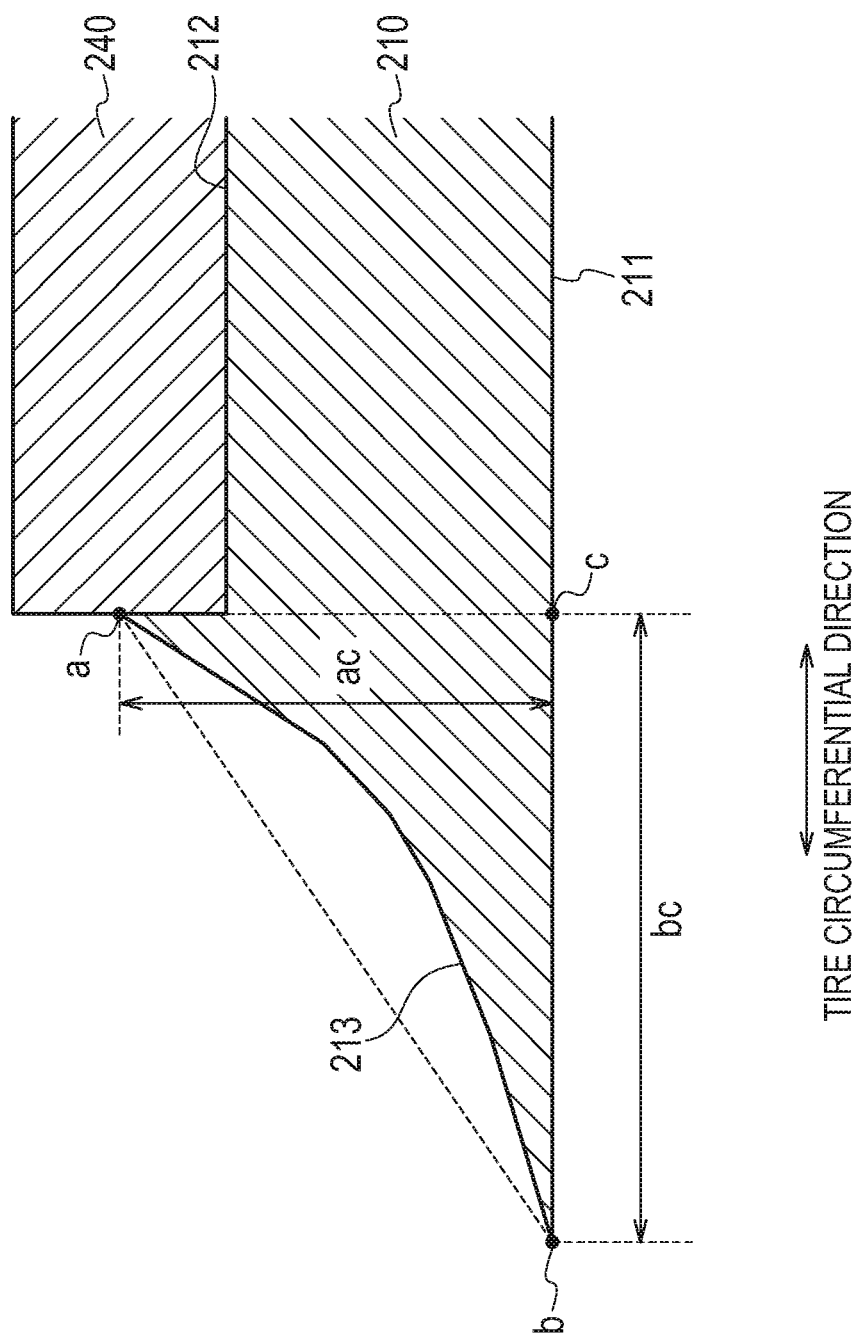
FIG. 12 is a diagram illustrating the pedestal 210 according to the first embodiment.

As shown in FIG. 12, the pedestal inclined surface 213 has a depressed portion recessed with a curvature of a curvature radius R toward the center of the pedestal 210 in the tire circumferential direction. The depressed portion includes a portion that comes in contact with the pedestal lower surface, in the pedestal inclined surface 213. In other words, the pedestal inclined surface 213 includes a depressed portion in a portion that comes in contact with the pedestal lower surface 211.

It is noted that in the first embodiment, a case where the whole pedestal inclined surface 213 is formed of the depressed portion is illustrated.

Herein, in the cross section in the tire circumferential direction, the meaning of each abbreviation is as follows:

a denotes a point farthest from the inner surface of the tire 100, in the pedestal inclined surface 213 (depressed portion);

b denotes a point that contacts the inner surface of the tire 100, in the pedestal inclined surface 213 (depressed portion);

c denotes an intersection point that intersects with a perpendicular line that extends down from the a to the pedestal lower surface 211, in the pedestal lower surface 211;

ab denotes a line segment that links a and b;

ac denotes a line segment that links a and c;

bc denotes a line segment that links b and c;

A denotes a shorter length, out of ac and bc; and

B denotes a longer length, out of ac and bc.

Herein, as described later, the smaller the curvature radius R of the depressed portion of the pedestal inclined surface 213, the more the shearing stress generated between the inner surface of the tire 100 and the pedestal lower surface 211 decreases. In particular, when the curvature radius R is smaller than $(A^2+B^2)^{0.5}$, the stress generated by the front-back input decreases. Therefore, the maximum value of the curvature radius R preferably is $(A^2+B^2)^{0.5}$.

Figure 13:
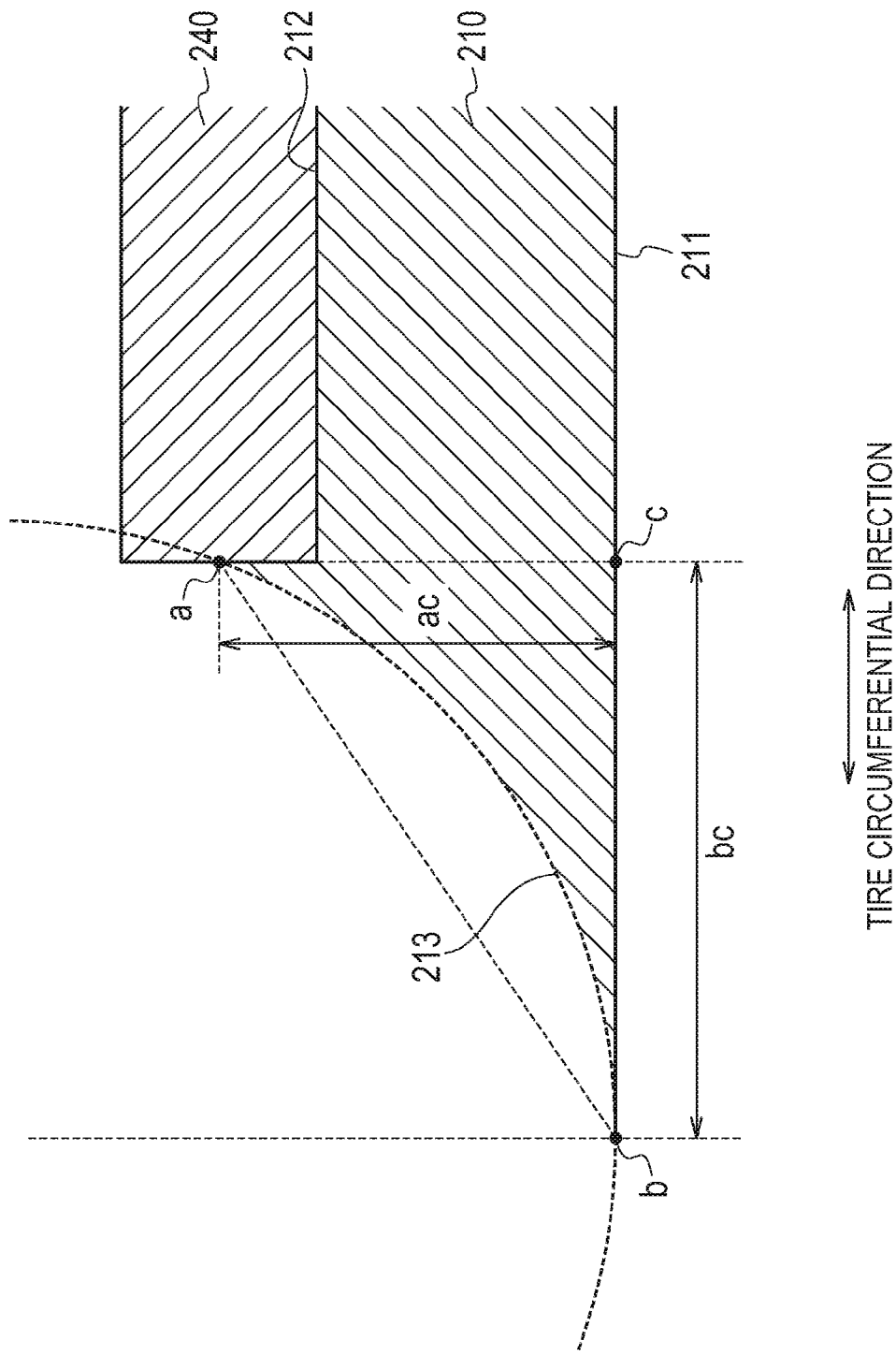
FIG. 13 is a diagram illustrating the pedestal 210 according to the first embodiment.

However, when $1/3^{0.5} \times B = A$, the relationship of $(A^2+B^2)/(2 \times A)=(A^2+B^2)^{0.5}$ is satisfied. In such a case, as shown in FIG. 13, a circle of curvature radius R is a circle that contacts a horizontal line that passes through b. In such a case, it is not possible to decrease the curvature radius R than a value of "$(A^2+B^2)/(2 \times A)$".

Therefore, it is necessary to consider two cases, that is, in case (1), a condition of $1/3^{0.5} \times B < A$ is satisfied, and in case (2), a condition of $A < 1/3^{0.5} \times B$ is satisfied.

In the case (1), the relationship of $(A^2+B^2)/(2 \times A) < (A^2+B^2)^{0.5}$ is satisfied, and thus, the minimum value of the curvature radius R is $(A^2+B^2)/(2 \times A)$. Therefore, the curvature radius R satisfies the relationship of $(A^2+B^2)/(2 \times A) < R < (A^2+B^2)^{0.5}$ In the case (2), the relationship of $(A^2+B^2)0.5 < (A^2+B^2)/(2 \times A)$ is satisfied, and thus, the minimum value of the curvature radius R is $(A^2+B^2)/(2 \times A)$. Therefore, the curvature radius R satisfies the relationship of $(A^2+B^2)/(2 \times A) < R$.

(Assembly of Attachment Structure)

Figure 14:
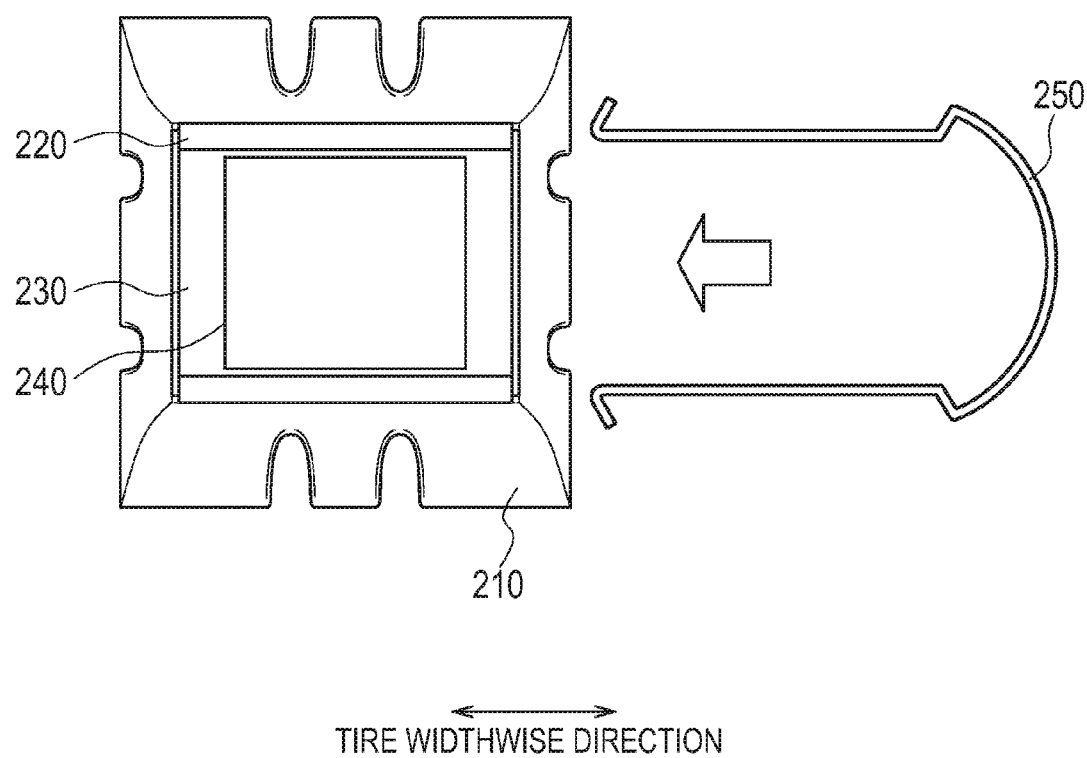
FIG. 14 is a diagram describing assembly of the attachment structure 200 according to the first embodiment.
Figure 15:
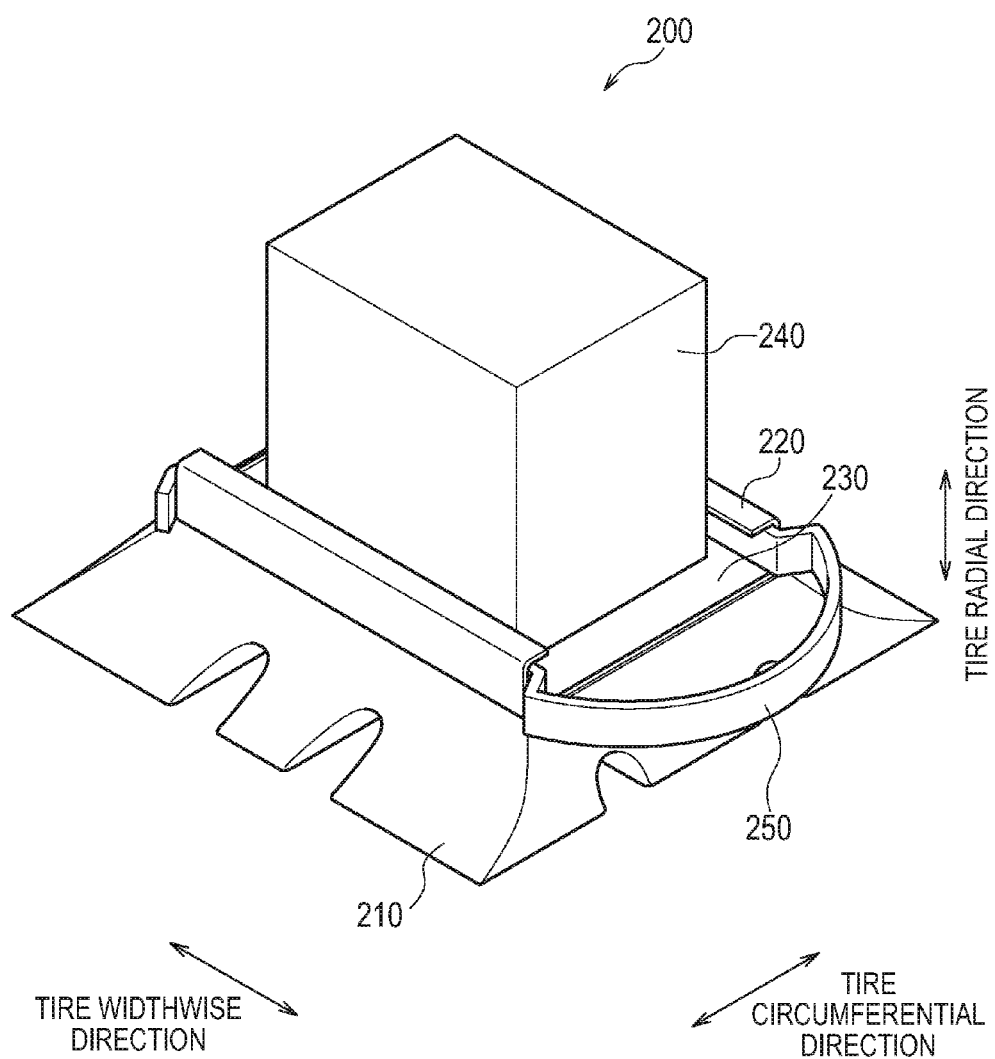
FIG. 15 is a diagram describing assembly of the attachment structure 200 according to the first embodiment.
Figure 16:
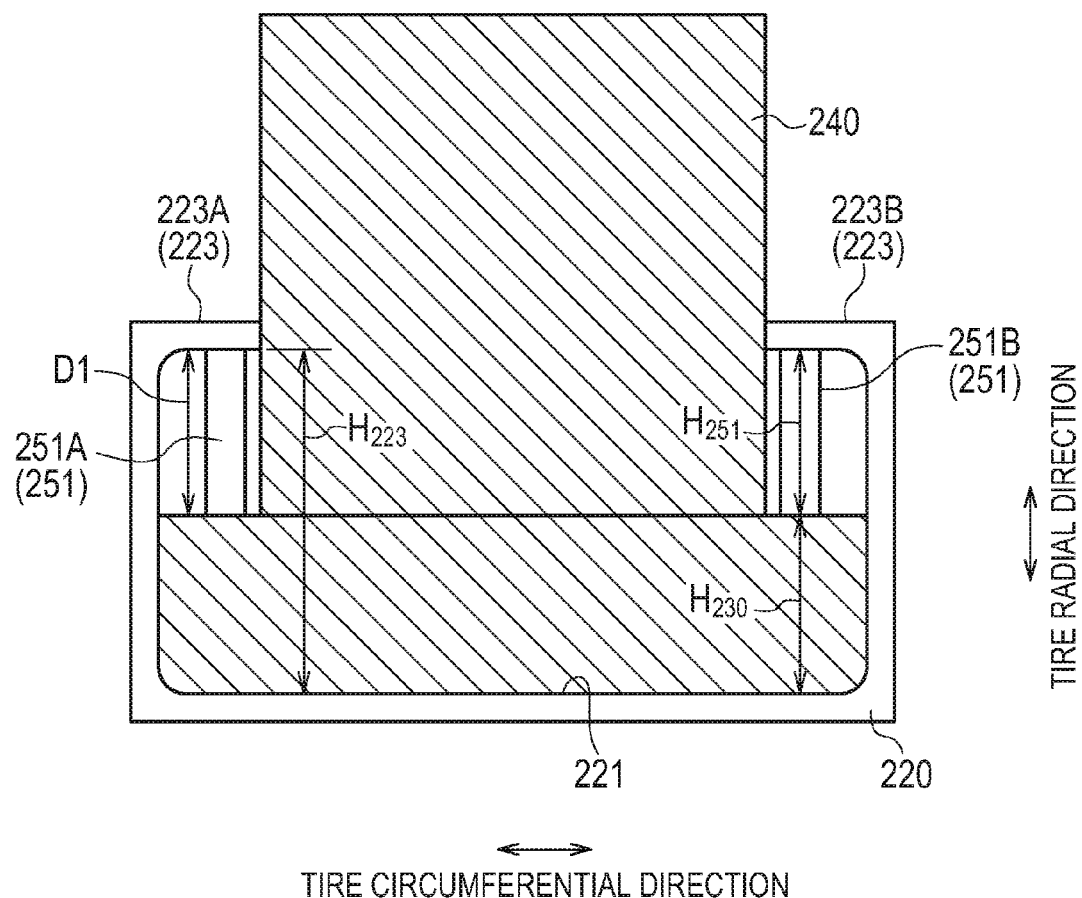
FIG. 16 is a diagram describing assembly of the attachment structure 200 according to the first embodiment.

Hereinafter, assembly of the attachment structure according to the first embodiment will be described. FIG. 14 to FIG. 16 are diagrams each describing assembly of the attachment structure 200 according to the first embodiment.

As shown in FIG. 14, the base 230 on which the function component 240 is loaded is placed in the frame 220 attached to the pedestal upper surface of the pedestal 210. Next, the insertion piece 250 is inserted along the tire widthwise direction. In particular, the insertion piece 250 is placed so that the arm unit 251 is inserted along the tire widthwise direction between the first wall body 222 and the function component 240. As a result, as shown in FIG. 15, the assembly of the attachment structure 200 is completed.

It is noted that as shown in FIG. 16, in the tire radial direction, the height $H_{223}$ from the bottom surface arranged on the bottom plate 221 to the lateral wall engagement piece 223 preferably is equal to a total of the height $H_{230}$ of the base 230 and the height $H_{251}$ of the arm unit 251. That is, the height $H_{251}$ of the arm unit 251 is equal to the difference $D_1$ between the height $H_{223}$ and the height $H_{230}$.

(Operation and Effect)

In the first embodiment, the pedestal lower surface 211 has a shape recessed toward a center of the pedestal 210 in the tire circumferential direction. Therefore, when the pedestal 210 is bonded to the inner surface of the tire 100, the end of the pedestal lower surface 211 comes into contact with the inner surface of the tire 100 before the center portion of the pedestal lower surface 211 comes into contact with the inner surface of the tire 100, in the tire circumferential direction. Therefore, even when the strength for pressing the pedestal lower surface 211 against the inner surface of the tire 100 is applied only to the center of the pedestal 210, it is possible to improve the bonding strength at the end of the pedestal lower surface 211 that is likely to act as a point from which the detachment starts.

Thereby, it should be noted that a complicated device is not necessary to make the strength for pressing the pedestal lower surface 211 against the inner surface of the tire 100 equal across the pedestal lower surface 211.

In the first embodiment, the pedestal inclined surface 213 has a depressed portion recessed toward the center of the pedestal 210 in the tire circumferential direction, and thus, the detachment from the inner surface of the tire 100 is restrained. Further, there is no need of utilizing soft rubber, and thus, a decrease in durability of the pedestal 210 is restrained.

Further, in the case (1) in which a condition of $1/3^{0.5} \times B < A < B$ is satisfied, the curvature radius R satisfies a relationship of $(A^2+B^2)/(2 \times A) < R < (A^2+B^2)^{0.5}$. Therefore, it is possible to appropriately define the curvature radius R of the depressed portion of the pedestal inclined surface.

Similarly, in the case (2) in which a condition of $A < 1/3^{0.5} \times B$ is satisfied, the curvature radius R satisfies a relationship of $(A^2+B^2)/(2 \times A) < R$. Therefore, it is possible to appropriately define the curvature radius R of the depressed portion of the pedestal inclined surface.

[First Modification of First Embodiment]

Hereinafter, a first modification of the first embodiment is explained. Mainly differences from the first embodiment are described below.

Figure 17:
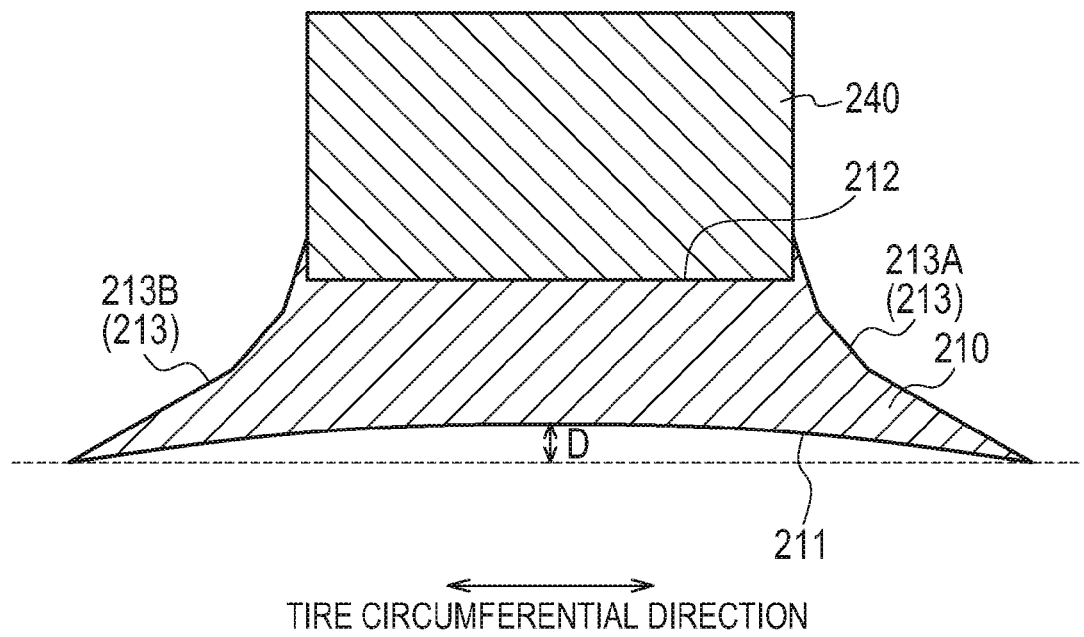
FIG. 17 is a diagram illustrating the pedestal 210 according to a first modification.

In the first embodiment, the pedestal inclined surface 213 is of flat shape in the state before the pedestal 210 is bonded to the inner surface of the tire 100. In contrast, in the first modification, as shown in FIG. 17, in the state before the pedestal 210 is bonded to the inner surface of the tire 100, the pedestal inclined surface 213 has a shape recessed toward the center of the pedestal 210, in the tire circumferential direction.

It is noted that the state after the pedestal 210 is bonded to the inner surface of the tire 100 is the same as that in the first embodiment, and thus, the description therefor will be omitted.

[Second Modification of First Embodiment]

A description will be given below of a second modification of the first embodiment. Mainly differences from the first embodiment are described below.

In the second modification, a variation of the shape of the pedestal inclined surface 213 will be described. It should be noted that in the second modification, the state after the pedestal 210 is bonded to the inner surface of the tire 100 will be described.

Figure 18:
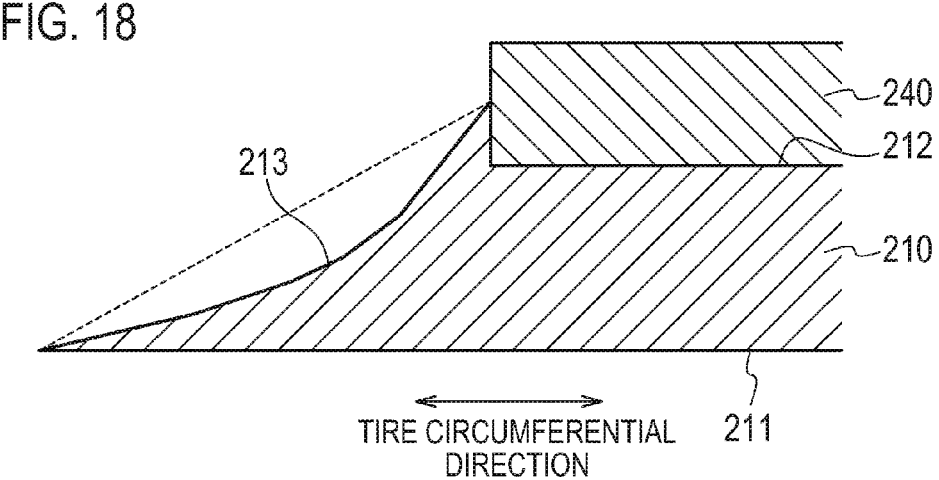
FIG. 18 is a diagram illustrating the pedestal 210 according to a second modification.
Figure 19:
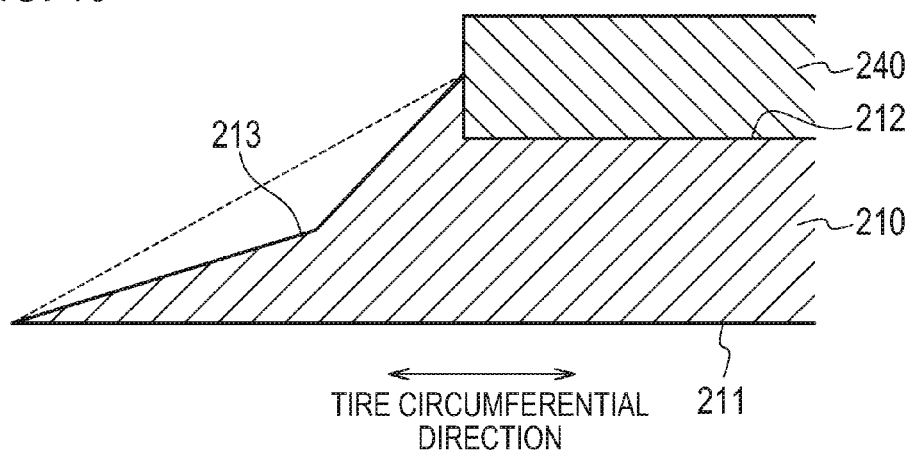
FIG. 19 is a diagram illustrating the pedestal 210 according to the second modification.

Specifically, as shown in FIG. 18, the whole pedestal inclined surface 213 may be formed of a curvature of the curvature radius R. Alternatively, as shown in FIG. 19, the pedestal inclined surface 213 is formed of a plurality of straight lines, and may approximately configure a curved line of the curvature radius R. Alternatively, as shown in FIG. 20, the pedestal inclined surface 213 may be formed of a plurality of curved lines each having a different curvature radius.

Figure 20:
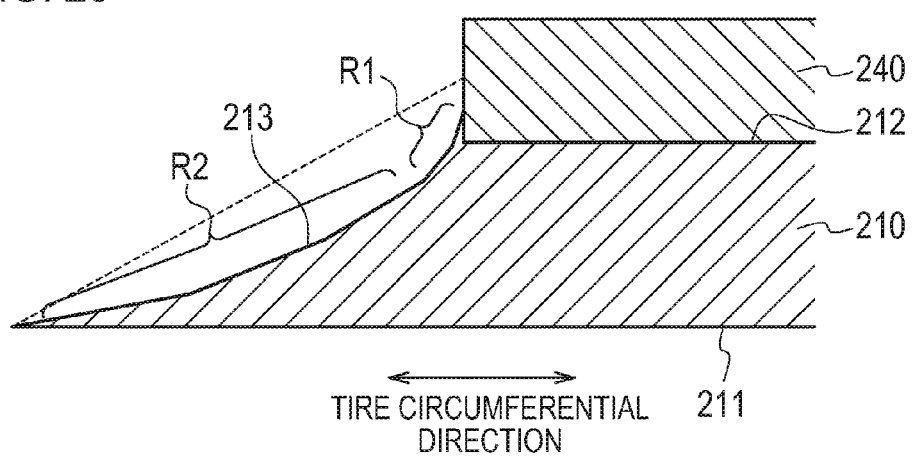
FIG. 20 is a diagram illustrating the pedestal 210 according to the second modification.

It should be noted that in a case illustrated in FIG. 20, the depressed portion having a curvature of the curvature radius R is a region including a portion that contacts with the pedestal lower surface 211, in the pedestal inclined surface 213.

[Stress Generated Between Pedestal and Inner Surface of Tire]

Hereinafter, the stress generated between the pedestal 210 (pedestal lower surface) and the inner surface of the tire 100 (inner liner) will be described.

(Wobbling)

Figure 21:
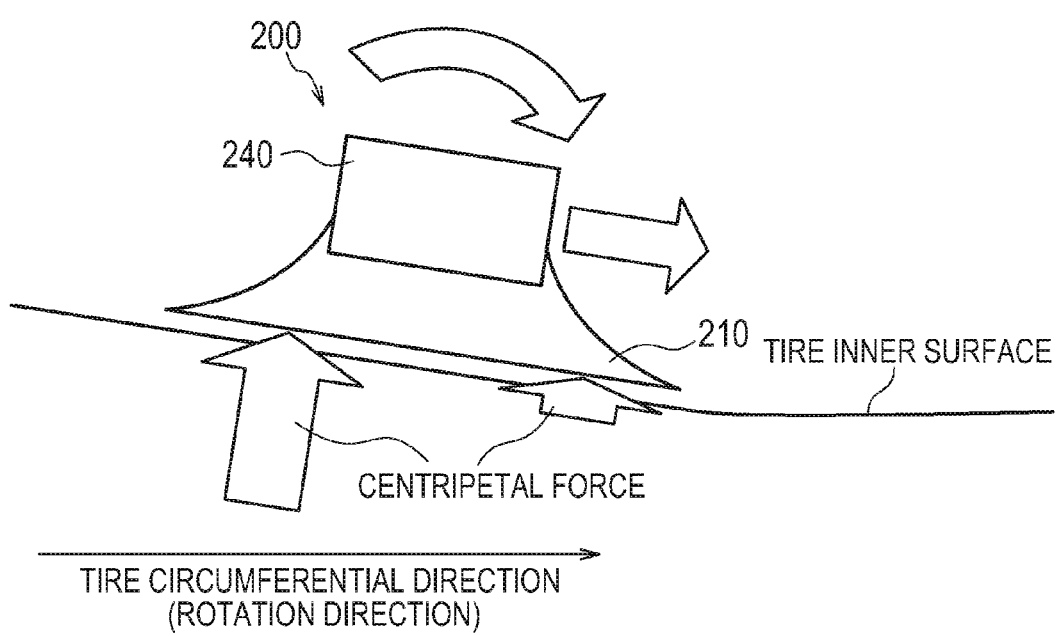
FIG. 21 is a diagram describing stress generated between the pedestal 210 and the tire 100.

Hereinafter, a wobbling will be described with reference to FIG. 21. As shown in FIG. 21, when the tire 100 comes into contact with the road surface in a state where the attachment structure 200 is bonded to the inner surface of the tire 100, the centripetal force generated along with the rotation of the tire 100 differs depending on each region of attachment structure 200.

Specifically, a case is considered where in the tire circumferential direction (rotation direction), the tire 100 corresponding to a front portion of the attachment structure 200 comes into contact with the road surface and the tire 100 corresponding to a rear portion of the attachment structure 200 does not come into contact with the road surface. In such a case, the centripetal force in the front portion of the attachment structure 200 is smaller than the centripetal force in the rear portion of the attachment structure 200. Therefore, in the tire circumferential direction (rotation direction), a stress that fells forward the attachment structure 200 is applied.

Similarly, a case is considered where in the tire circumferential direction (rotation direction), the tire 100 corresponding to the front portion of the attachment structure 200 does not come into contact with the road surface and the tire 100 corresponding to the rear portion of the attachment structure 200 comes into contact with the road surface. In such a case, the centripetal force in the rear portion of the attachment structure 200 is smaller than the centripetal force in the front portion of the attachment structure 200. Therefore, in the tire circumferential direction (rotation direction), a stress that fells backward the attachment structure 200 is applied.

When the stress that fells forward the attachment structure 200 or the stress that fells backward the attachment structure 200 (that is, a front-rear stress) is applied repeatedly, along with the rotation of the tire 100, to the attachment structure 200, behavior in which the attachment structure 200 acts as if to wobble the head backward and forward is generated. This generates a stress (stress generated by the front and back input) generated between the pedestal 210 (pedestal lower surface) and the inner surface of the tire 100 (inner liner).

(Deformation of Inner Liner)

Figure 22:
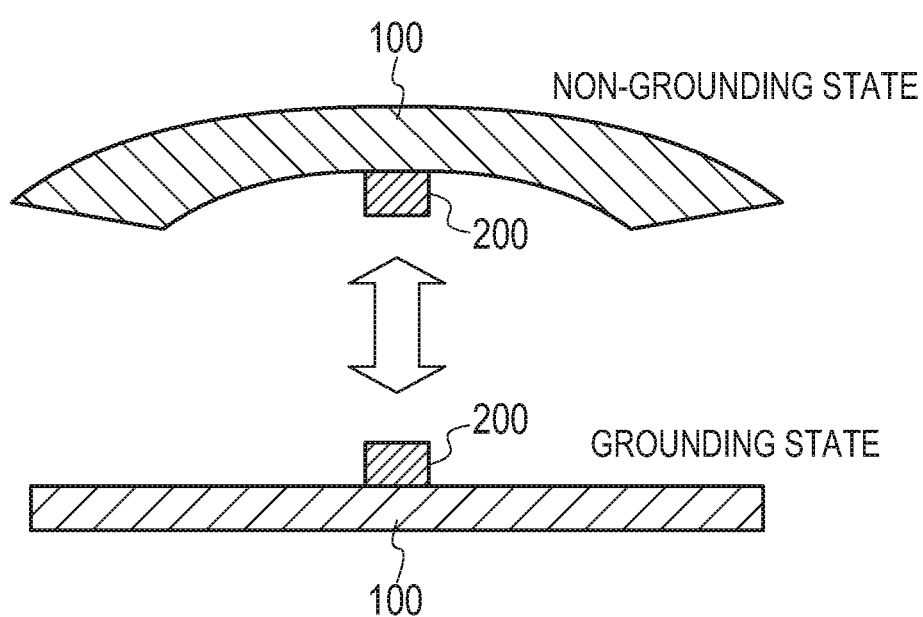
FIG. 22 is a diagram describing stress generated between the pedestal 210 and the tire 100.

Hereinafter, a deformation of the inner liner will be described with reference to FIG. 22. As shown in FIG. 22, between a state where the tire 100 comes into contact with a road surface (grounding state) and a state where the tire 100 does not come into contact with the road surface (non-grounding state), the shape of the inner liner differs. That is, in the grounding state, the inner liner is of flat shape, and in the non-grounding state, the inner liner is of arc shape.

When the grounding state (flat shape) and the non-grounding state (arc shape) are repeated along with the rotation of the tire 100, a stress (stress generated by bending input) generated between the pedestal 210 (pedestal lower surface) and the inner surface (inner liner) of the tire 100 occurs.

[Curvature Radius of Depressed Portion]

Figure 23:
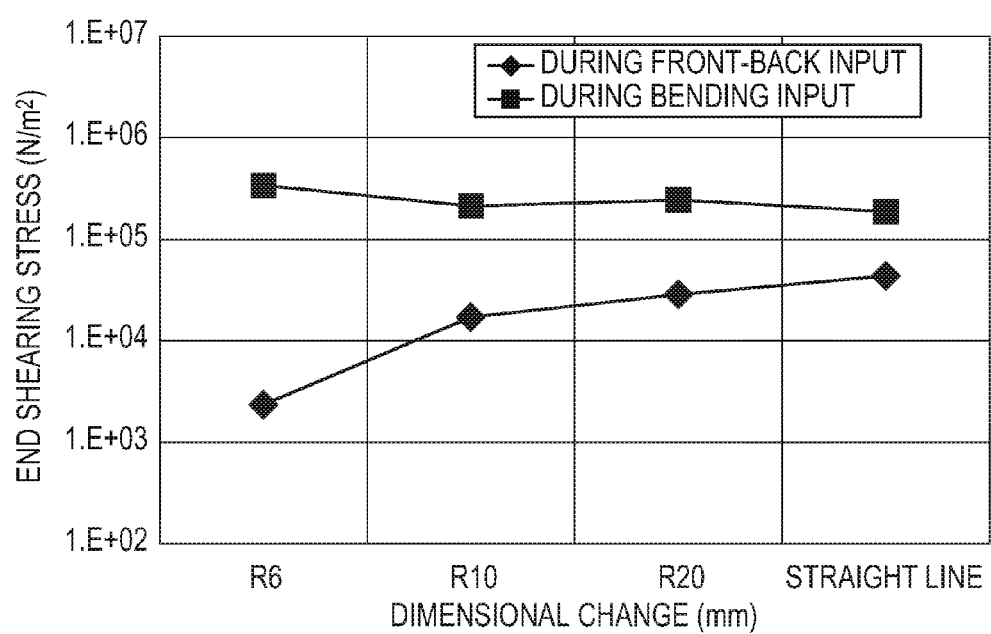
FIG. 23 is a diagram describing a relationship between a curvature radius of the pedestal inclined surface 213 and a shearing stress.

Hereinafter, the curvature radius of the depressed portion will be described with reference to FIG. 23. As shown in FIG. 23, the smaller the curvature radius R of the depressed portion of the pedestal inclined surface 213, the more the shearing stress generated between the inner surface of the tire 100 and the pedestal lower surface 211 decreases.

It is noted that in the measurement illustrated in FIG. 23, the dimension of each member is as follows:
Adhesive length of pedestal 210=41 mm
Adhesive width of pedestal 210=35 mm
Thickness of pedestal 210=6 mm
Attachment length of function component 240=26 mm
Attachment width of function component 240=35 mm
bc=8.5 mm (B)
ac=6.0 mm (A)
ab=$(A^2+B^2)^{0.5}$=10.4 mm As shown in FIG. 23, when the curvature radius R of the depressed portion of the pedestal inclined surface 213 is equal to or less than 10 mm, the stress generated by front-back input decreases. Therefore, the curvature radius R preferably is smaller than $(A^2+B^2)^{0.5}$.

[Evaluation Result 1]

Hereinafter, an evaluation result 1 will be described with reference to FIG. 24. Specifically, Example 1 and Comparative Example 1 to Comparative Example 3 were prepared. In particular, the curvature radius R of the depressed portion of the pedestal inclined surface 213 was changed, and the stress generated by the front and back input (at the time of the front and back input) and the stress generated by the bending input (at the time of bending input) were measured.

Herein, as the stress generated by the front-back input, 300 N, that is, the inertia f exerted on the function component 240 (the center of gravity X) was added, and then, the stress generated at the end of the pedestal 210 (pedestal lower surface 211) in the tire circumferential direction was measured. As the stress generated by the bending input, the pedestal lower surface 211 was artificially deformed so that the curvature radius R of the pedestal lower surface 211 (the inner surface of the tire 100) was 300 mm in the tire circumferential direction, and the stress generated at the end of the pedestal 210 (the pedestal lower surface 211) in the tire circumferential direction was measure.

Figure 24:
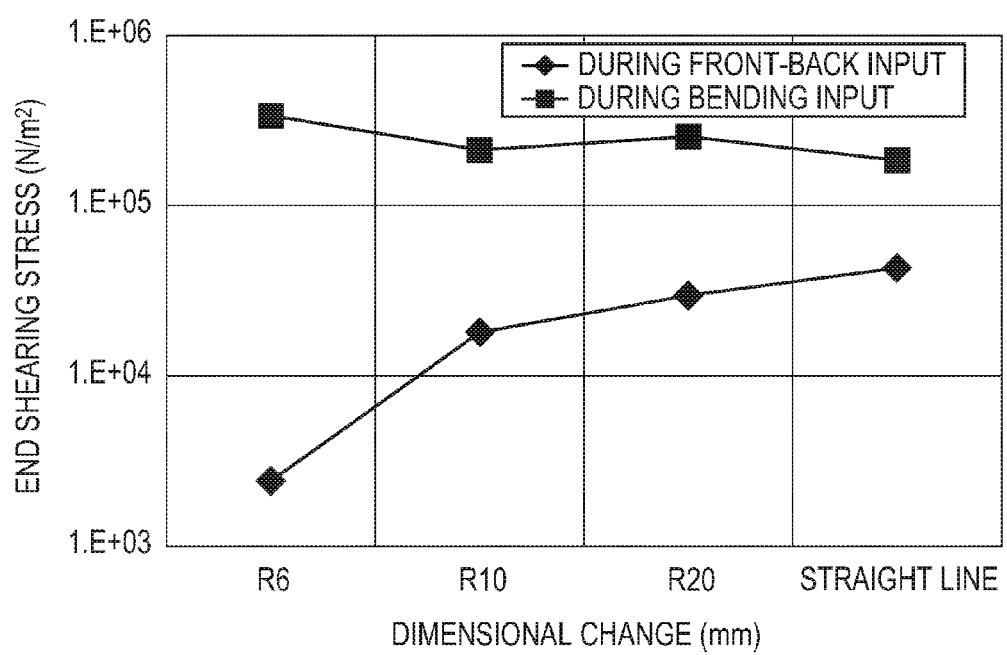
FIG. 24 is a diagram describing an evaluation result.

(Common Condition)
Adhesive length of pedestal 210=41 mm
Adhesive width of pedestal 210=35 mm
Thickness of pedestal 210=3 mm
Attachment length of function component 240=26 mm
Attachment width of function component 240=35 mm
Young's modulus of elastic member configuring pedestal 210=7 MPa
bc=8.5 mm (B)
ac=6.0 mm (A)
ab=$(A^2+B^2)^{0.5}$=10.4 mm As shown in FIG. 24, the smaller the curvature radius R, the more the stress generated by front-back input decreases. On the other hand, the smaller the curvature radius R, the more the stress generated by the bending input increases. Therefore, when a balance between the stress generated by the front-back input and the stress generated by the bending input is considered, it is confirmed that the optimal value of the curvature radius R is $(A^2+B^2)^{0.5}$=10.4 mm.

It is noted that it is confirmed that the smaller the curvature radius R, the more the stress generated by the front-back input decreases, and thus, the curvature radius R preferably is smaller than $(A^2+B^2)^{0.5}$.

[Evaluation Result 2]

Hereinafter, an evaluation result 2 will be described with reference to FIG. 25. Specifically, Example 2 and Comparative Example 4 to Comparative Example 6 were prepared. In particular, similarly to the evaluation result 1, the curvature radius R of the depressed portion of the pedestal inclined surface 213 was changed, and the stress generated by the front and back input (at the time of the front and back input) and the stress generated by the bending input (at the time of bending input) were measured.

Figure 25:
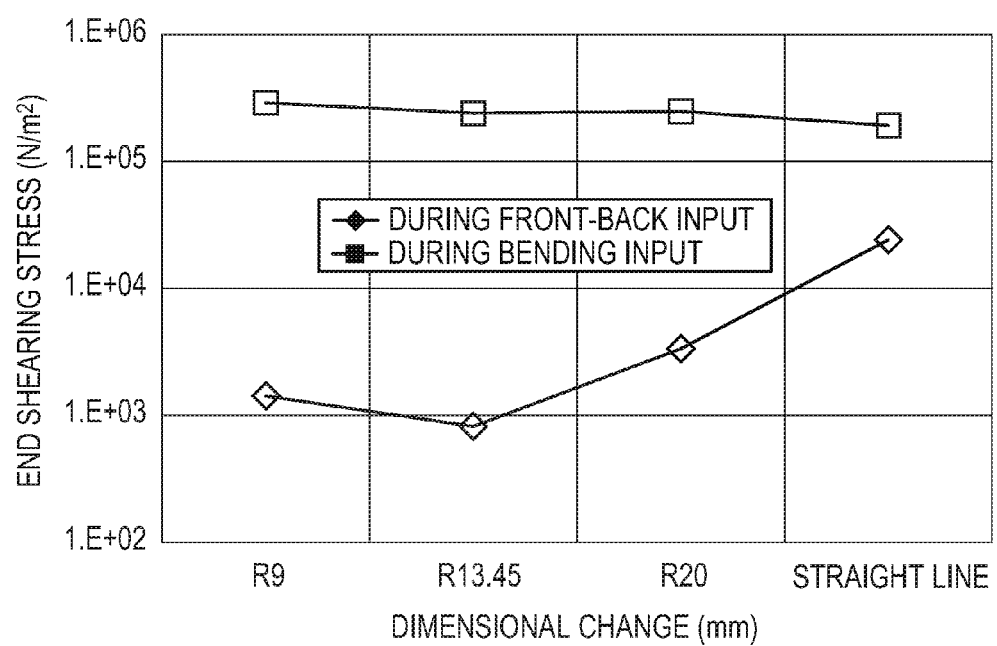
FIG. 25 is a diagram describing an evaluation result.

(Common Condition)
Adhesive length of pedestal 210=41 mm
Adhesive width of pedestal 210=35 mm
Thickness of pedestal 210=6 mm
Attachment length of function component 240=21 mm
Attachment width of function component 240=35 mm
Young's modulus of elastic member configuring pedestal 210=7 MPa
bc=10 mm(B)
ac=9 mm(A)
ab=$(A^2+B^2)^{0.5}$=13.45 mm As shown in FIG. 25, the smaller the curvature radius R, the more the stress generated by front-back input decreases. On the other hand, the smaller the curvature radius R, the more the stress generated by the bending input increases. Therefore, when a balance between the stress generated by the front-back input and the stress generated by the bending input is considered, it is confirmed that the optimal value of the curvature radius R is $(A^2+B^2)^{0.5}$=10.4 mm.

It is noted that it is confirmed that the smaller the curvature radius R, the more the stress generated by the front-back input decreases, and thus, the curvature radius R preferably is smaller than $(A^2+B^2)^{0.5}$.

[Third Modification of First Embodiment]

A description will be given below of a third modification of the first embodiment. Mainly differences from the first embodiment are described below.

In the third modification, in addition to the insertion piece 250, a fitting member for fixing the base 230 to the frame 220 is arranged.

(Configuration of Base)

Figure 26:
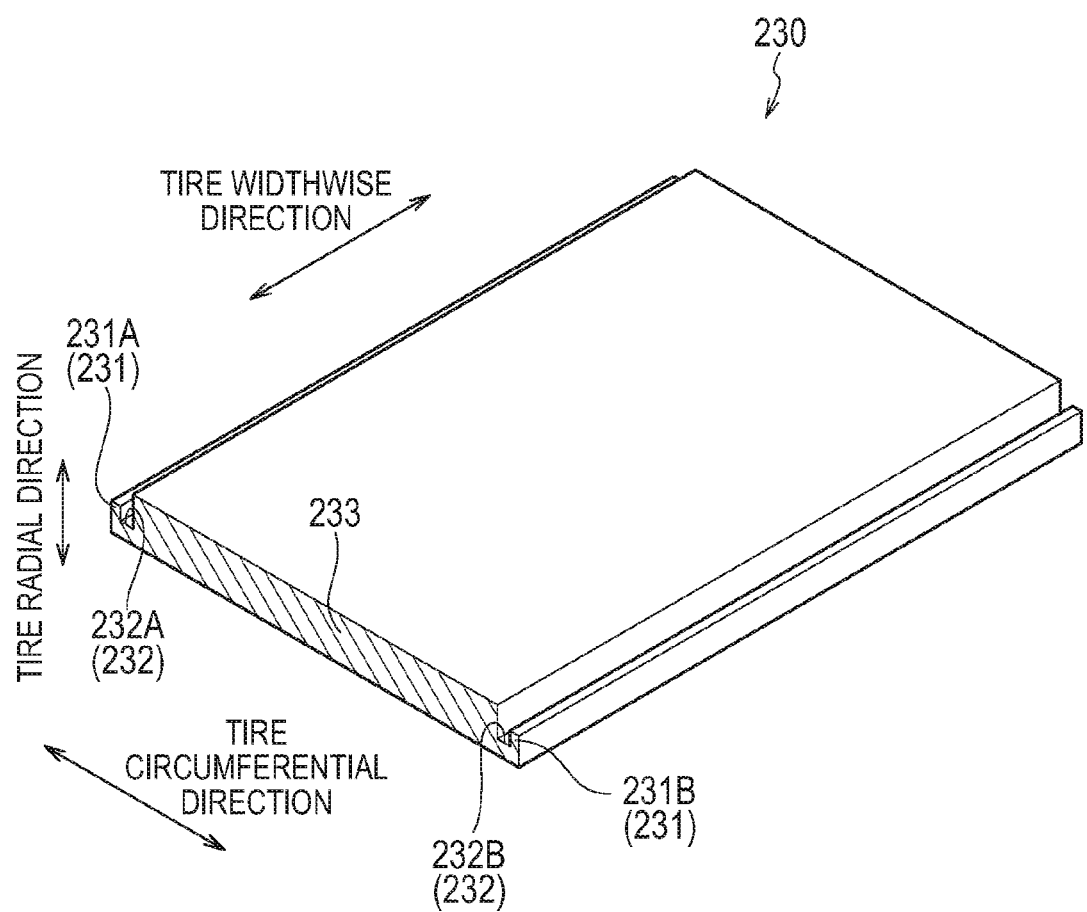
FIG. 26 is a diagram illustrating a base 230 according to a third modification.

Hereinafter, the configuration of the base according to the third modification will be described. FIG. 26 is a diagram illustrating the base 230 according to the first embodiment.

As shown in FIG. 26, the base 230 includes a pair of lateral walls 231 (a lateral wall 231A and a lateral wall 231B), a pair of grooves 232 (a groove 232A and a groove 232B), and a main body 233.

The lateral wall 231 is of shape standing upright in the tire radial direction. The lateral wall 231 extends along the tire widthwise direction. The lateral wall 231A and the lateral wall 231B are arranged on both sides in the tire circumferential direction, relative to the main body 233.

The groove 232 is of shape recessed in the tire radial direction. The groove 232 extends along the tire widthwise direction. The groove 232A and the groove 232B are arranged on both sides in the tire circumferential direction, relative to the main body 233. In particular, the groove 232A is arranged between the lateral wall 231A and the main body 233. The groove 232B is arranged between the lateral wall 231B and the main body 233.

The main body 233 configures the main body of the base 230. On the upper surface of the main body 233, the function component 240 is placed. It is noted that in the third modification, in the tire radial direction, the height of the main body 233 is higher than the height of the lateral wall 231.

(Assembly of Attachment Structure)

Hereinafter, assembly of the attachment structure according to the third modification will be described. FIG. 27 and FIG. 28 are diagrams each describing assembly of the attachment structure 200 according to the third modification. It is noted that FIG. 28 is a diagram showing an A-A cross section shown in FIG. 27. Further, it should be noted that in FIG. 27 and FIG. 28, the pedestal 210 is omitted.

As shown in FIG. 27 and FIG. 28, in the third modification, in addition to the insertion piece 250, a fitting member 260 (a fitting member 260A and a fitting member 260B) for fixing the base 230 to the frame 220 is provided.

The fitting member 260 is formed of a member having a predetermined rigidity. The fitting member 260 is inserted into the frame 220, and restricts a movement of the base 230 housed in the frame 220. In the third modification, the fitting member 260 is of plate shape. Further, the height, in the tire radial direction, of the fitting member 260 gradually changes along the tire widthwise direction. That is, the fitting member 260 is of wedged shape (tapered shape) in the tire widthwise direction.

Herein, the insertion piece 250 is placed between the groove 232 and the lateral wall engagement piece 223, as shown in FIG. 27. In other words, a part of the insertion piece 250 is placed within the groove 232.

Further, the fitting member 260 is placed between the lateral wall 231 and the lateral wall engagement piece 223, as shown in FIG. 27. In particular, as shown in FIG. 28, a lower surface 260X of the fitting member 260 is of shape running along an upper surface 231X of the lateral wall 231. In other words, the upper surface 231X of the lateral wall 231 has an inclination relative to the tire widthwise direction. Similarly, the lower surface 260X of the fitting member 260 has an inclination relative to the tire widthwise direction.

As described above, the lateral wall 231 of the base 230 has an inclination relative to the tire widthwise direction, and has the upper surface 231X contacting the fitting member 260. On the other hand, the fitting member 260 has an inclination along the upper surface 231X of the lateral wall 231, and has the lower surface 260X contacting the upper surface 231X of the lateral wall 231.

Therefore, between the upper surface 231X of the lateral wall 231 and the lateral wall engagement piece 223, the fitting member 260 is inserted along the tire widthwise direction, and thereby, the fitting member 260 presses down the base 230 and the fitting member 260 presses up the lateral wall engagement piece 223, in the tire radial direction. As a result, the base 230 is fixed within the frame 220.

[Fourth Modification of First Embodiment]

A description will be given below of a fourth modification of the first embodiment. Mainly differences from the third modification are described below.

Figure 29:
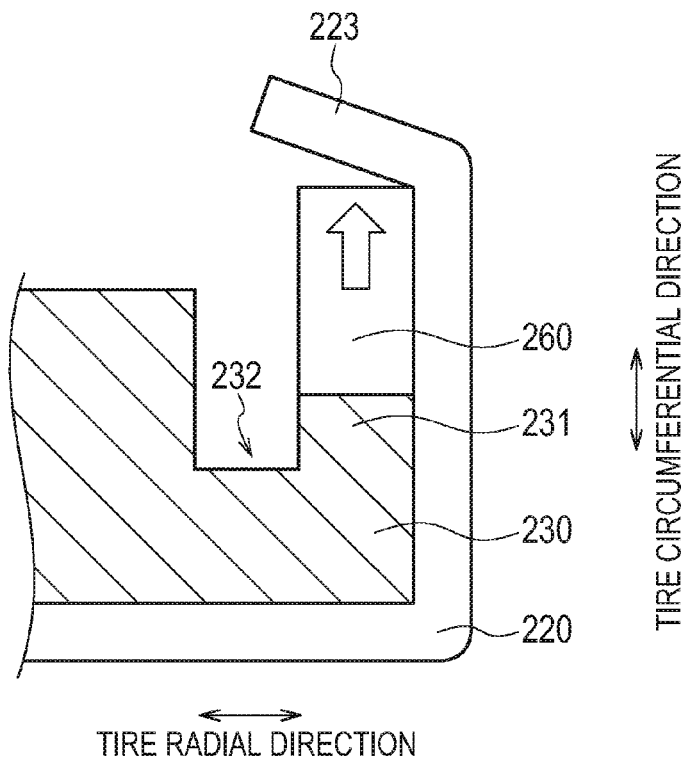
FIG. 29 is a diagram describing falling off of a fitting member 260 according to a fourth modification.
Figure 30:
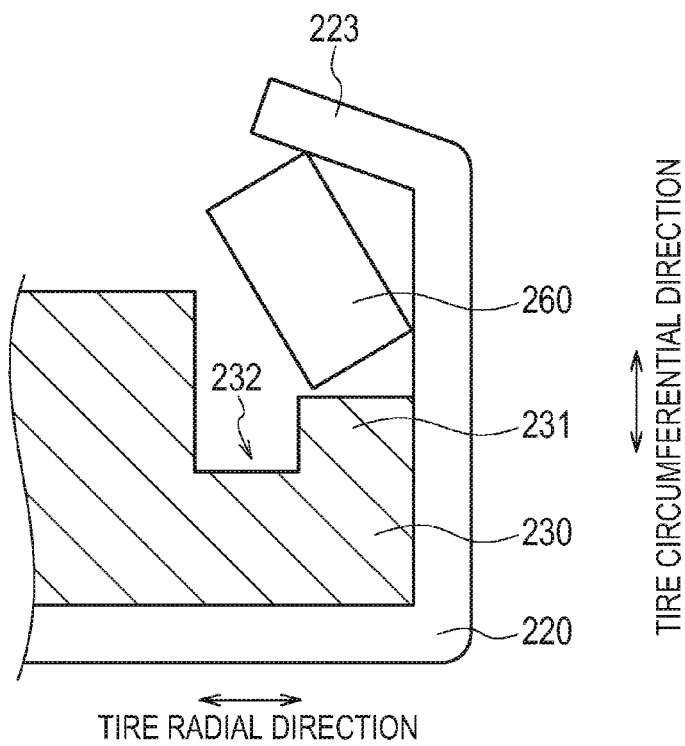
FIG. 30 is a diagram describing falling off of the fitting member 260 according to the fourth modification.

Specifically, in the third modification, when the fitting member 260 is inserted too deeply, as shown in FIG. 29, the lateral wall engagement piece 223 is deformed, and as shown in FIG. 30, the fitting member 260 may fall off.

Figure 31:
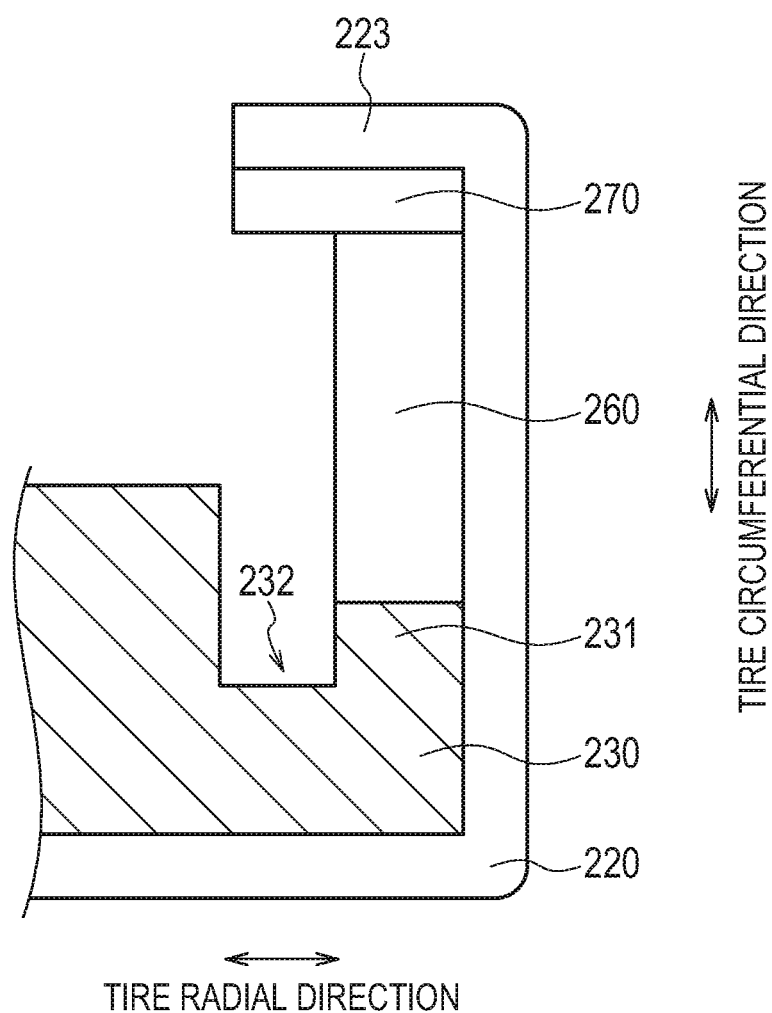
FIG. 31 is a diagram describing an elastic layer 270 according to the fourth modification.

Therefore, in the fourth modification, as shown in FIG. 31, an elastic layer 270 is arranged on the lower surface of the lateral wall engagement piece 223. The elastic layer 270 is formed of an elastic body such as rubber. The elastic layer 270 is arranged between the lateral wall engagement piece 223 and the fitting member 260. In the tire radial direction, the thickness of the elastic layer 270 preferably is equal to or less than 1 mm.

Thus, when the elastic layer 270 is placed, the falling off of the fitting member 260 in the tire circumferential direction is restrained. Similarly, the falling off of the fitting member 260 is restrained in the tire widthwise direction.

[Fifth Modification of First Embodiment]

Hereinafter, a fifth modification of the first embodiment is explained. Mainly differences from the third modification are described below.

Figure 32:
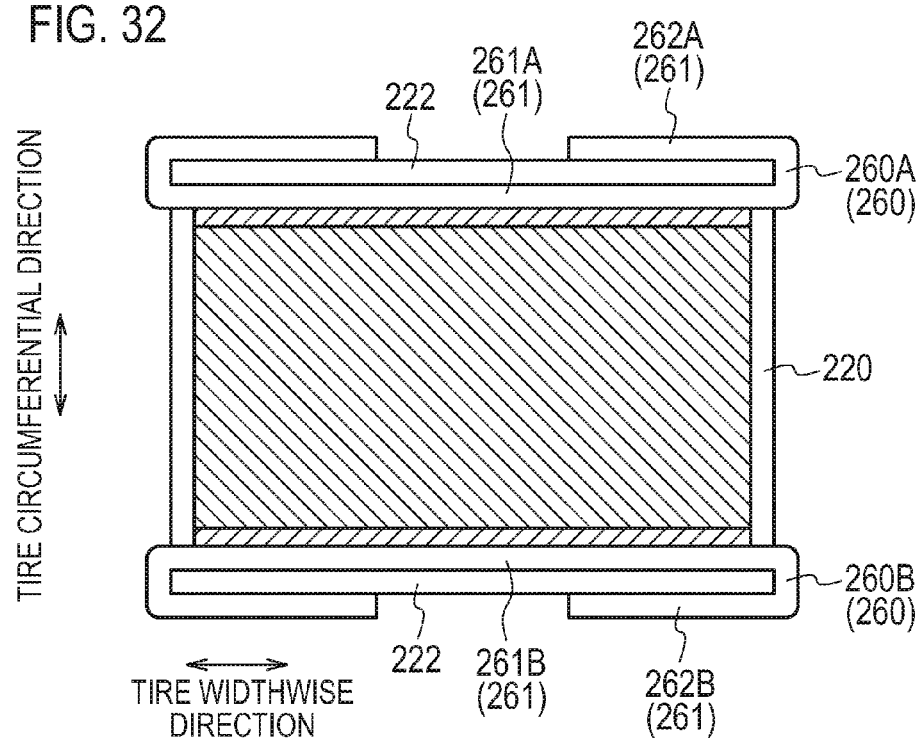
FIG. 32 is a diagram describing the fitting member 260 according to a fifth modification.
Figure 33:
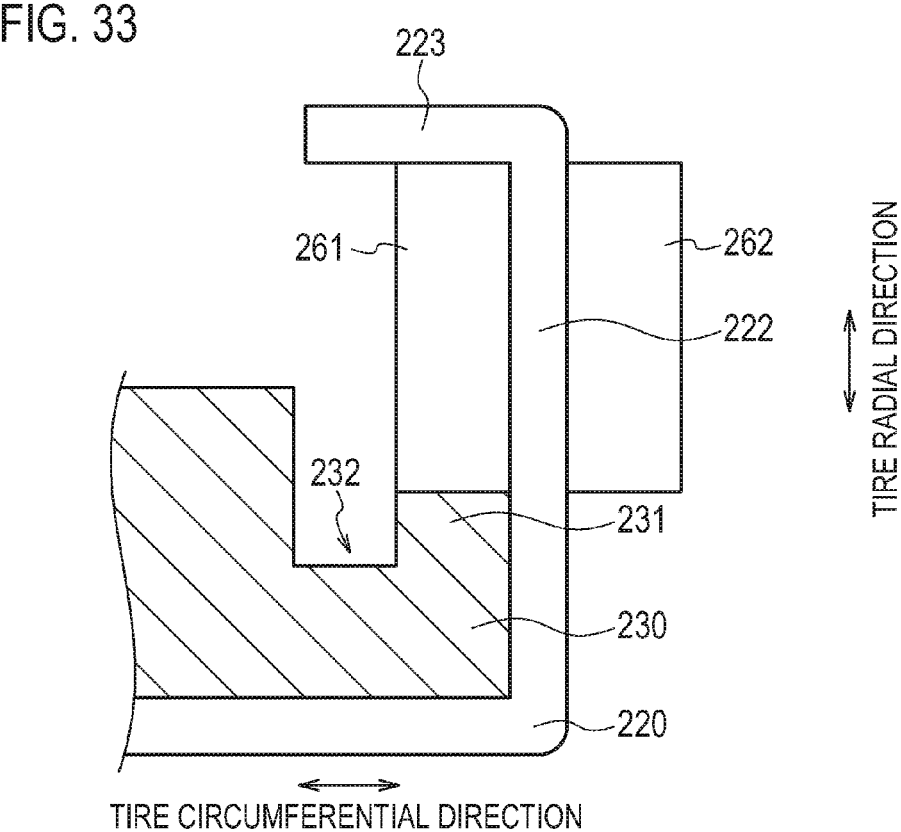
FIG. 33 is a diagram describing the fitting member 260 according to the fifth modification.

In the fifth modification, the fitting member 260 has a main body 261 (a main body 261A and a main body 261B) and a folded unit 262 (a folded unit 262A and a folded unit 262B), as shown in FIG. 32 and FIG. 33.

The main body 261 is a portion, in the fitting member 260, placed between the lateral wall 231 and the lateral wall engagement piece 223. The folded unit 262 is a portion that is continued to the main body 261 and is folded back so that the first wall body 222 is enclosed therein. In particular, the folded unit 262 is folded back in the tire circumferential direction, and folded back in the tire widthwise direction. In the fifth modification, the folded unit 262 is arranged at both ends of the main body 261, in the tire widthwise direction.

Therefore, the falling off of the fitting member 260 in the tire widthwise direction is restrained.

[Other Embodiments According to First Embodiment]

The present invention is explained through the above-described first embodiment, but it must not be understood that this invention is limited by the statements and the drawings constituting a part of this disclosure. From this disclosure, various alternative embodiments, examples, and operational technologies will become apparent to those skilled in the art.

In the first embodiment, a case where the attachment structure 200 includes the frame 220, the base 230, and the insertion piece 250 is illustrated; however, the embodiments are not limited thereto. The attachment structure 200 may not include the frame 220, the base 230, and the insertion piece 250. That is, the attachment structure 200 may be configured only by the pedestal 210.

In the first embodiment, as a dimensional expression, a term of "equal to" was used; naturally, it is possible to accept a dimension error.

It should be noted that the "predetermined rigidity" used in the first embodiment is at least larger than the rigidity of a member (elastic member) configuring the pedestal.

In the first embodiment, the shape of the frame upper surface of the frame 220 is rectangular. However, the embodiment is not limited thereto. Specifically, the shape of the frame upper surface of the frame 220 may be triangular or another shape.

In the first embodiment, the pedestal lower surface 211 has a shape recessed toward a center of the pedestal 210 in a cross section in the tire circumferential direction. However, the embodiment is not limited thereto. The pedestal lower surface 211 may have a shape recessed toward a center of the pedestal 210 in a cross section in the tire widthwise direction.

Next, a second embodiment of the present invention will be explained. It is noted that in the second embodiment, a difference from the first embodiment will be mainly described.

[Overview of Second Embodiment]

An attachment structure according to the second embodiment relates to a structure that attaches a function component having a function of detecting a state of a tire to an inner surface of the tire. The attachment structure includes: a pedestal having a pedestal lower surface formed of an elastic member and bonded to the inner surface of the tire, and a pedestal upper surface arranged opposite the pedestal lower surface; a frame having a bottom plate formed of a member having a predetermined rigidity and having a frame lower surface placed on the pedestal upper surface and a frame upper surface arranged opposite the frame lower surface; and a base which is formed of a member having a predetermined rigidity and on which the function component is mounted. The frame upper surface is defined by a first direction and a second direction crossing the first direction. The frame includes, on the frame upper surface, a pair of first-direction lateral walls extending along the first direction and standing upright in a vertical direction relative to the frame upper surface. The base is placed on the frame upper surface so as to be fit between the pair of first-direction lateral walls. The pedestal includes a pair of protrusions extending along the second direction and arranged with an interval in the first direction. The frame is placed to be fit between the pair of protrusions in the first direction.

In the second embodiment, the base is placed on the frame upper surface so as to be fit between the pair of first-direction lateral walls. That is, the frame restricts the movement of the base in the second direction, and thus, the function component mounted on the base does not move by the vibration of a tire. Therefore, it is possible to attach the function component to the inner surface of a tire so as to detect a high frequency vibration, for example.

In the second embodiment, the frame is placed to be fit between the pair of protrusions in the first direction. That is, the pair of protrusions arranged in the pedestal restrict the movement of the frame, and the function component mounted on the base housed in the frame does not move by the vibration of a tire.

[Second Embodiment]
(Configuration of Attachment Structure)

Figure 34:
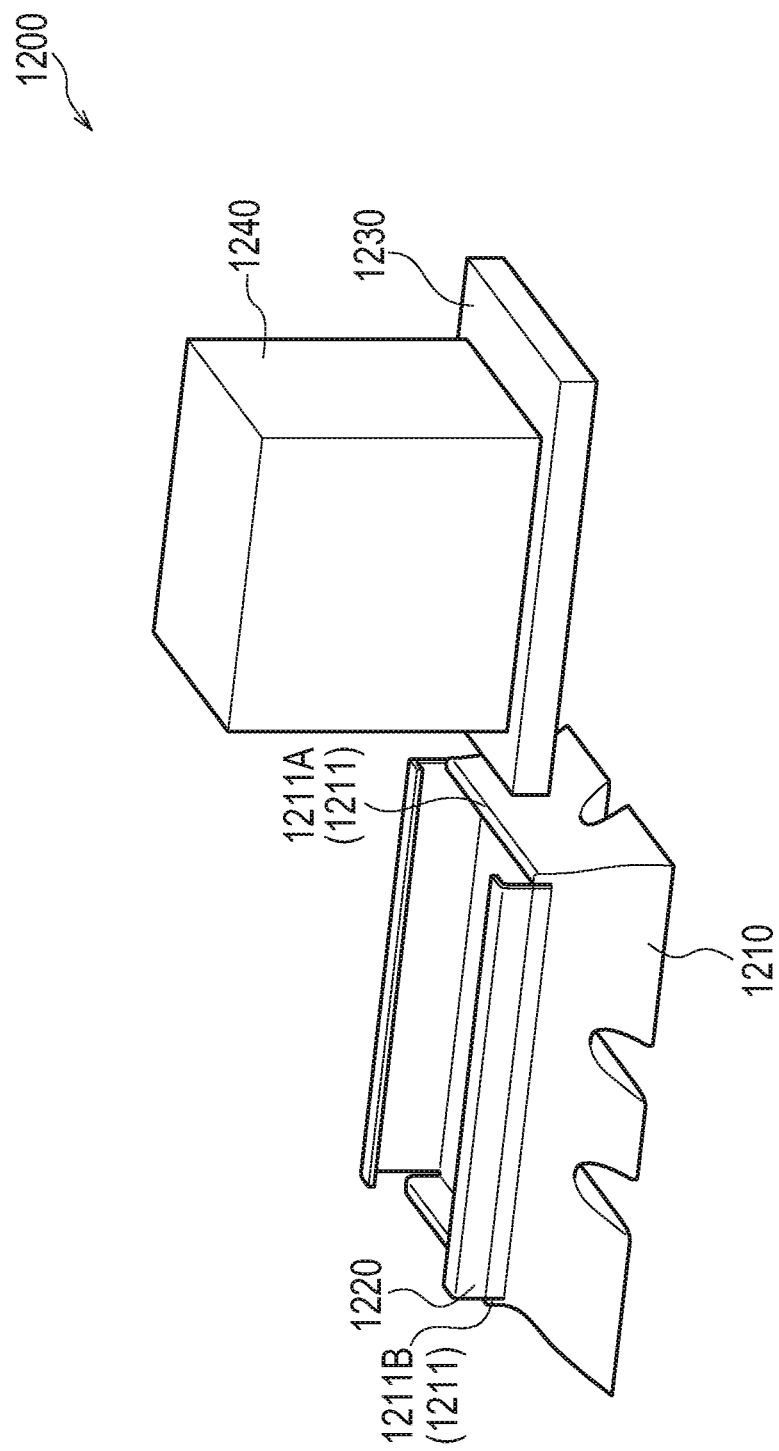
FIG. 34 is a diagram illustrating an attachment structure 1200 according to a second embodiment.

The configuration of the attachment structure according to the second embodiment will be described, below. FIG. 34 is a diagram illustrating an attachment structure 1200 according to a second embodiment. In this case, it should be noted that the attachment structure 1200 is bonded to the inner surface of the tire 100. In particular, the attachment structure 1200 is bonded to the inner surface, of the tire 100, extending along the tire circumferential direction, that is, the inner surface of the tire 100 configuring the tread unit 40.

As shown in FIG. 34, the attachment structure 1200 includes a pedestal 1210, a frame 1220, a base 1230, and a function component 1240.

The pedestal 1210 is formed of an elastic member (elastomer). For example, the pedestal 1210 is formed of natural rubber or synthetic rubber. The pedestal 1210 includes a pedestal lower surface bonded to the inner surface of the tire 100 and a pedestal upper surface arranged opposite the pedestal lower surface. For example, the pedestal 1210 is bonded to the inner surface of the tire 100 by cure adhesion. On the pedestal upper surface of the pedestal 1210, the function component 1240 is arranged via the frame 1220 and the base 1230.

Herein, the pedestal 1210 includes a pair of protrusions 1211 (a protrusion 1211A and a protrusion 1211B) extending along the second direction and arranged with an interval in the first direction. The pair of protrusions 1211 restrict the movement of at least the base 1230 in the first direction. It is noted that in the second embodiment, the pair of protrusions 1211 restrict the movement of the frame 1220.

The frame 1220 is formed of a member having a predetermined rigidity. The frame 1220 is placed on the pedestal upper surface of the pedestal 1210. For example, the surface of the frame 1220 is brass-plated, the pedestal 1210 includes cobalt, and the frame 1220 is bonded to the pedestal 1210 by cure adhesion.

In the second embodiment, the frame 1220 is of box shape housing the base 1230. It is noted that the frame 1220 will be described in detail later (see FIG. 35 to FIG. 37).

The base 1230 is formed of a member having a predetermined rigidity. In the base 1230, the function component 1240 is loaded. In the second embodiment, the base 1230 is of substantially rectangular parallelepiped shape, and housed in the frame 1220.

The function component 1240 includes a function of detecting a state of the tire 100. The examples of the function component 1240 include a pressure sensor for detecting an inner pressure of the tire 100, a temperature sensor for detecting an inner temperature of the tire 100, and an accelerometer for detecting a rotation speed of the tire 100.

(Configuration of Frame)

Figure 35:
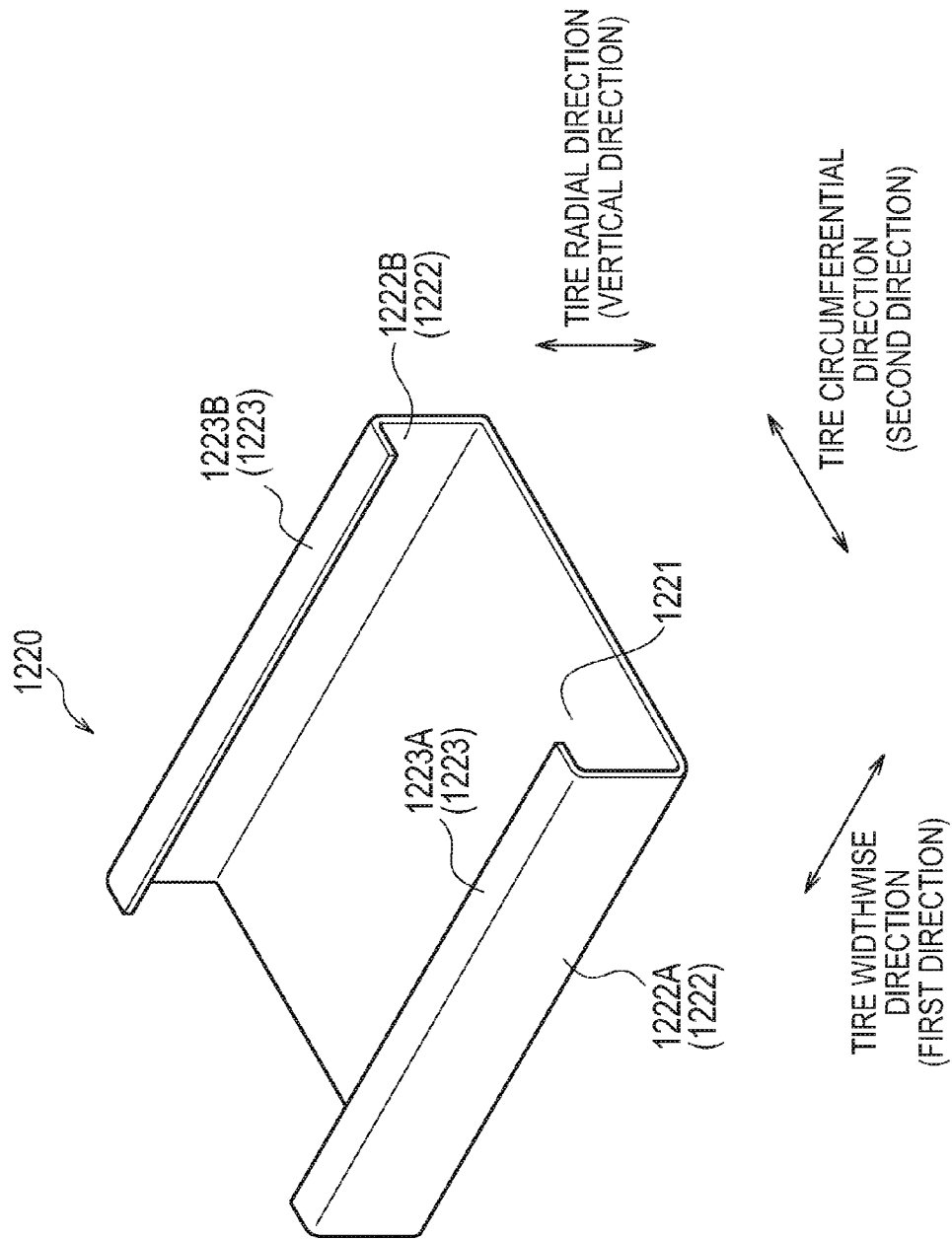
FIG. 35 is a diagram illustrating a frame 1220 according to the second embodiment.

The configuration of the frame according to the second embodiment will be described, below. FIG. 35 is a diagram illustrating a frame 1220 according to the second embodiment.

As shown in FIG. 35, the frame 1220 includes a bottom plate 1221, a pair of first wall bodies 1222 (a first wall body 1222A and a first wall body 1222B) and a pair of lateral wall engagement pieces 1223 (a lateral wall engagement piece 1223A and a lateral wall engagement piece 1223B).

The bottom plate 1221 includes a frame lower surface placed on the pedestal upper surface and a frame upper surface arranged opposite the frame lower surface. The frame upper surface is defined by a first direction and a second direction crossing the first direction. On the frame upper surface of the bottom plate 1221, the base 1230 is loaded. It is noted that in the second embodiment, the bottom plate 1221 is of plate shape, and includes a frame upper surface of rectangular shape.

The first wall body 1222A and the first wall body 1222B are arranged on the bottom plate 1221. The first wall body 1222A and the first wall body 1222B are of shape that stands upright in the vertical direction relative to the bottom plate 1221. The first wall body 1222A and the first wall body 1222B extend along the first direction. The first wall body 1222A and the first wall body 1222B are arranged with an interval in the second direction crossing the first direction.

In the second embodiment, the first wall body 1222A is configured such that the tip in the vertical direction relative to the bottom plate 1221 is the lateral wall engagement piece 1223A that bends toward the first wall body 1222B side in the second direction. The lateral wall engagement piece 1223A extends along the first direction. Similarly, the first wall body 1222B is configured such that the tip in the vertical direction relative to the bottom plate 1221 is the lateral wall engagement piece 1223B that bends toward the first wall body 1222A side in the second direction. The lateral wall engagement piece 1223B extends along the first direction.

Thus, in the second embodiment, the bottom plate 1221 and the pair of first wall bodies 1222 configure a box shape.

In the second embodiment, an example where the attachment structure 1200 is bonded to the tire 100, where the first direction is the tire widthwise direction, will be described. To clarify the description, the first direction is called the tire widthwise direction, the second direction is called the tire circumferential direction, and the vertical direction is called the tire radial direction, below.

(Dimension of Frame)

Figure 36:
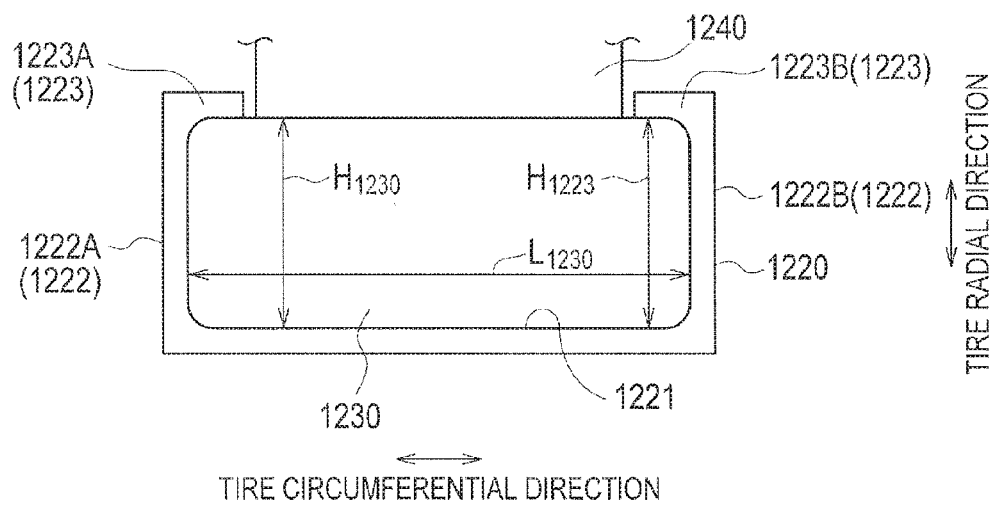
FIG. 36 is a diagram illustrating the frame 1220 according to the second embodiment.
Figure 37:
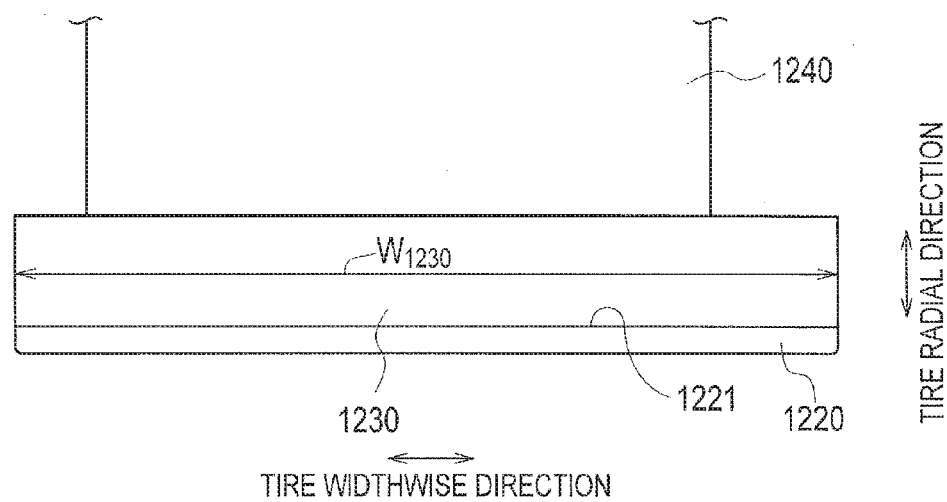
FIG. 37 is a diagram illustrating the frame 1220 according to the second embodiment.

The dimension of the frame according to the first embodiment will be described, below. FIG. 36 and FIG. 37 are diagrams each illustrating the frame 1220 according to the second embodiment. It is noted that FIG. 36 and FIG. 37 illustrate a state where the base 1230 is housed in the frame 1220.

As shown in FIG. 36, in the tire radial direction, $H_{1223}$ denotes the height from the frame upper surface of the frame 1220 to the lateral wall engagement piece 1223. In the tire radial direction, $H_{1230}$ denotes the height of the base 1230. In the tire circumferential direction, $L_{1230}$ denotes the length of the base 1230.

In the second embodiment, in the tire circumferential direction, an interval between a pair of first wall bodies 1222 is equal to the length $L_{1230}$ of the base 230. Therefore, the pair of first wall bodies 1222 restrain the movement of the base 1230 in the tire circumferential direction. In other words, the base 1230 is placed on the frame upper surface of the frame 1220 so as to be fit between the pair of first wall bodies 1222.

Further, the height $H_{1223}$ from the frame upper surface of the frame 1220 to the lateral wall engagement piece 1223 is equal to the height $H_{1230}$ of the base 1230. Therefore, the lateral wall engagement piece 1223 restrains the movement of the base 1230 in the tire radial direction.

As shown in FIG. 37, in the tire widthwise direction, $W_{1230}$ denotes the width of the base 1230. Further, in the tire widthwise direction, the width of the bottom plate 1221 preferably is equal to the width $W_{1230}$ of the base 1230.

(Configuration of Pedestal)

Figure 38:
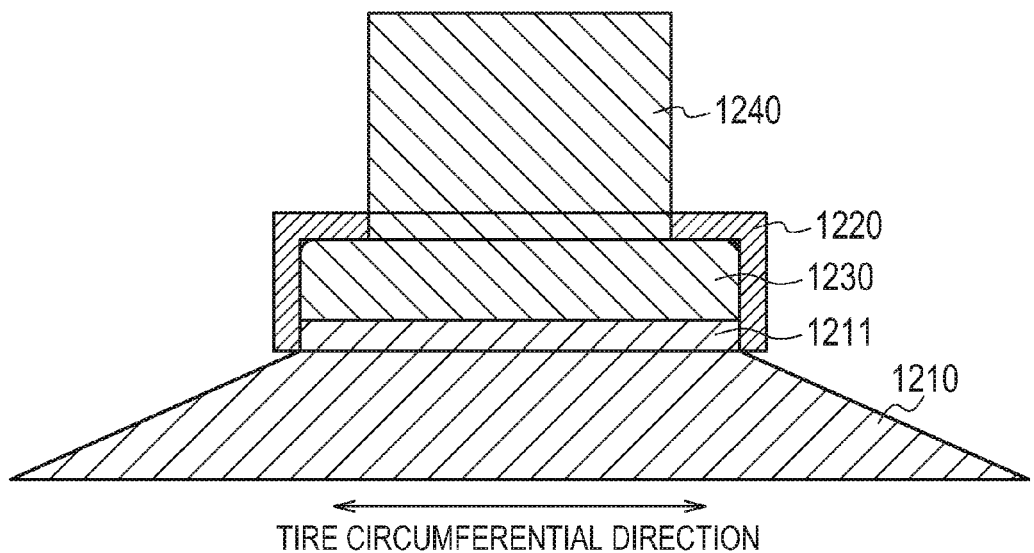
FIG. 38 is a diagram illustrating a pedestal 1210 according to the second embodiment.
Figure 39:
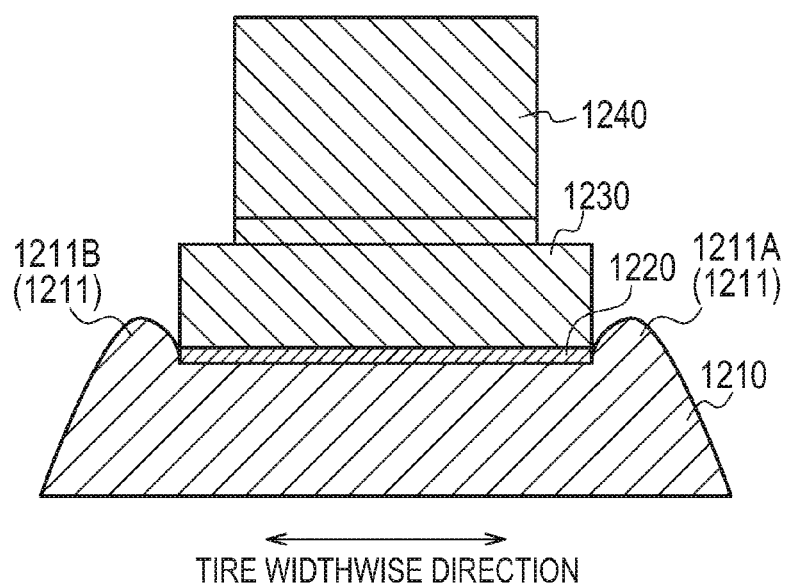
FIG. 39 is a diagram illustrating the pedestal 1210 according to the second embodiment.

The configuration of the pedestal according to the second embodiment will be described, below. FIG. 38 and FIG. 39 are diagrams each illustrating the pedestal 1210 according to the second embodiment.

As shown in FIG. 38 and FIG. 39, the pedestal 1210 includes a pair of protrusions 1211 extending along the tire circumferential direction and arranged with an interval in the tire widthwise direction. The above-described frame 1220 is placed to be fit between the pair of protrusions 1211 in the tire widthwise direction. Further, the above-described base 1230 also is placed to be fit between the pair of protrusions 1211 in the tire widthwise direction.

(Operation and Effect)

An operation and an effect of the attachment structure according to the second embodiment will be described, below.

Herein, in recent years, there is a demand for attaching a sensor, as a function component, for detecting a high frequency vibration occurring as a result of friction between a tire and a road surface, to an inner surface of a tire. A conventional technology has a problem in that the function component is attached to the inner surface of a tire by tension strength of rubber patch, and thus, the function component moves due to the vibration of the tire, which makes it difficult to detect the high frequency vibration.

In the second embodiment, the base 1230 is placed on the frame upper surface of the frame 1220 so as to be fit between the pair of first-direction lateral walls (the first wall body 1222A and the first wall body 1222B). That is, the frame 1220 restricts the movement of the base 1230 in the tire circumferential direction, and thus, the function component 1240 mounted on the base 1230 does not move by the vibration of the tire 100. Therefore, it is possible to attach the function component 1240 to the inner surface of the tire 100 so as to detect a high frequency vibration, for example.

In the second embodiment, the frame 1220 is placed to be fit between the pair of protrusions 1211 in the tire widthwise direction. That is, the pair of protrusions 1211 arranged in the pedestal 1210 restrict the movement of the frame 1220, and the function component 1240 mounted on the base 1230 housed in the frame 1220 does not move by the vibration of the tire 100.

In the second embodiment, the base 1230 also is placed to be fit between the pair of protrusions 1211 in the tire widthwise direction. Therefore, the pair of protrusions 1211 arranged in the pedestal 1210 restrict the movement of the base 1230, and the function component 1240 mounted on the base 1230 does not move by the vibration of the tire 100.

[First Modification of Second Embodiment]

Hereafter, a first modification of the second embodiment is explained. Mainly the differences from the second embodiment are described, below.

Figure 40:
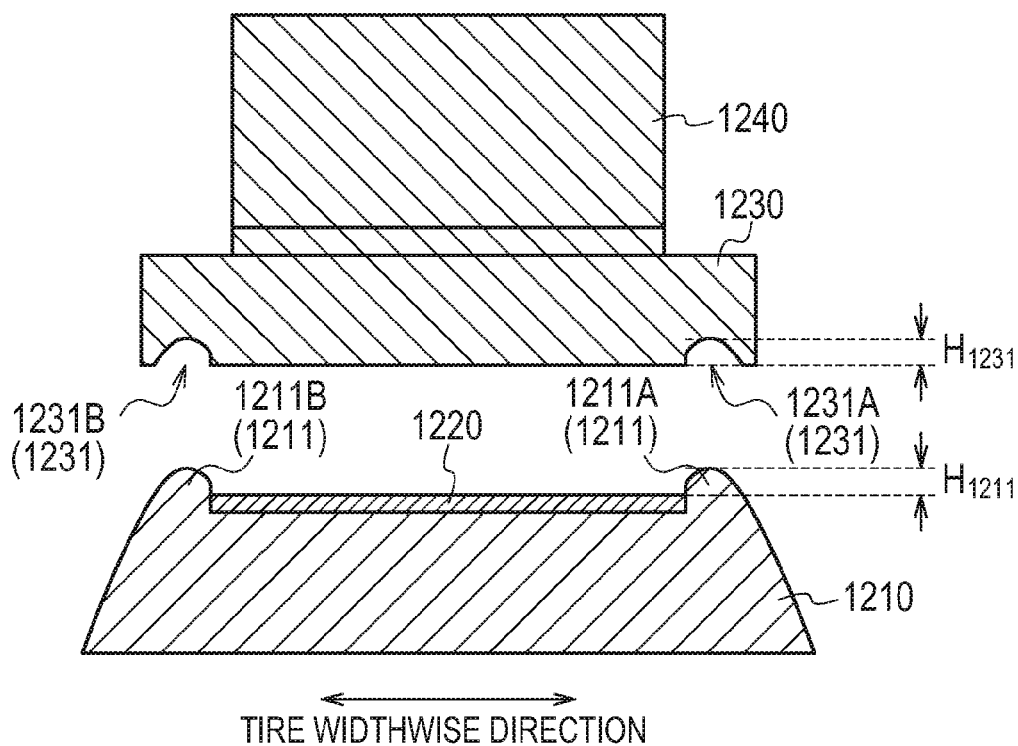
FIG. 40 is a diagram illustrating the pedestal 1210 according to a first modification.
Figure 41:
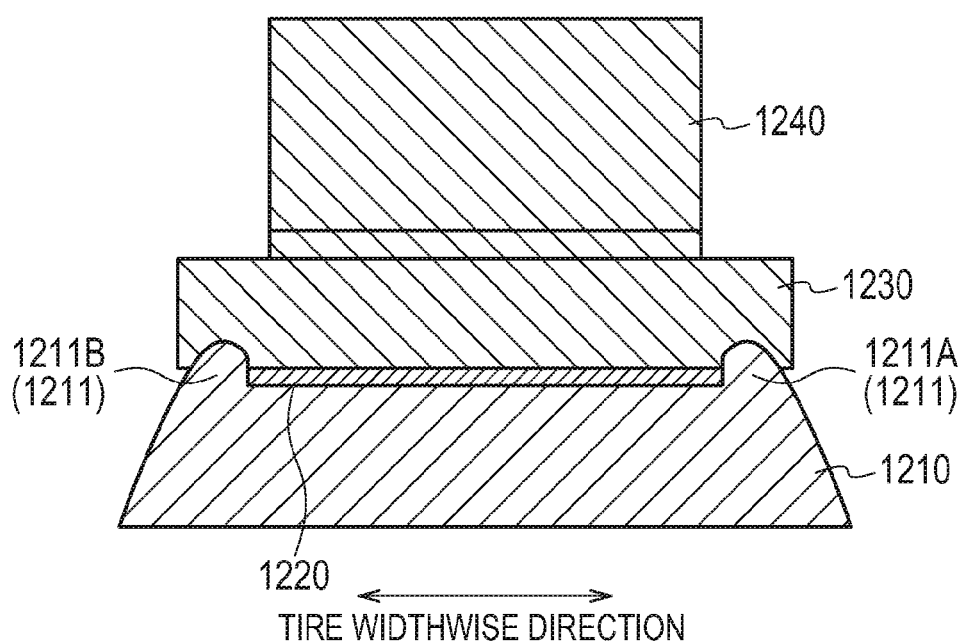
FIG. 41 is a diagram illustrating the pedestal 1210 according to the first modification.

In the first modification, as shown in FIG. 40 and FIG. 41, the base 1230 includes a pair of groove portions 1231 (a groove portion 1231A and a groove portion 1231B) extending along the tire circumferential direction and arranged with an interval in the tire widthwise direction. The base 1230 is placed in the pedestal 1210 so that the pair of protrusions 1211 arranged in the pedestal 1210 are fit to the pair of groove portions 1231.

Herein, in the tire radial direction, the depth $H_{1231}$ of the pair of groove portions 1231 preferably is smaller than the height $H_{1211}$ of the pair of protrusions 1211. In other words, the base 1230 is placed in the pedestal 1210 while squashing the pair of protrusions 1211. Therefore, the strength with which the pair of protrusions 1211 restrict the movement of the base 1230 in the tire widthwise direction increases.

It should be noted that in the tire widthwise direction, the interval between the pair of groove portions 1231 is equal to the interval between the pair of protrusions 1211.

It should be also noted that the fitting between the pair of groove portions 1231 and the pair of protrusions 1211 restrict the movement of the base 1230 in the tire widthwise direction.

[Second Modification of Second Embodiment]

Hereafter, a second modification of the second embodiment will be described. Mainly the differences from the second embodiment are described, below.

In the second modification, a neck is arranged between the function component and the base. In the tire circumferential direction, the size of the neck is smaller than the sizes of the function component and the base.

(Wobbling)

Figure 42:
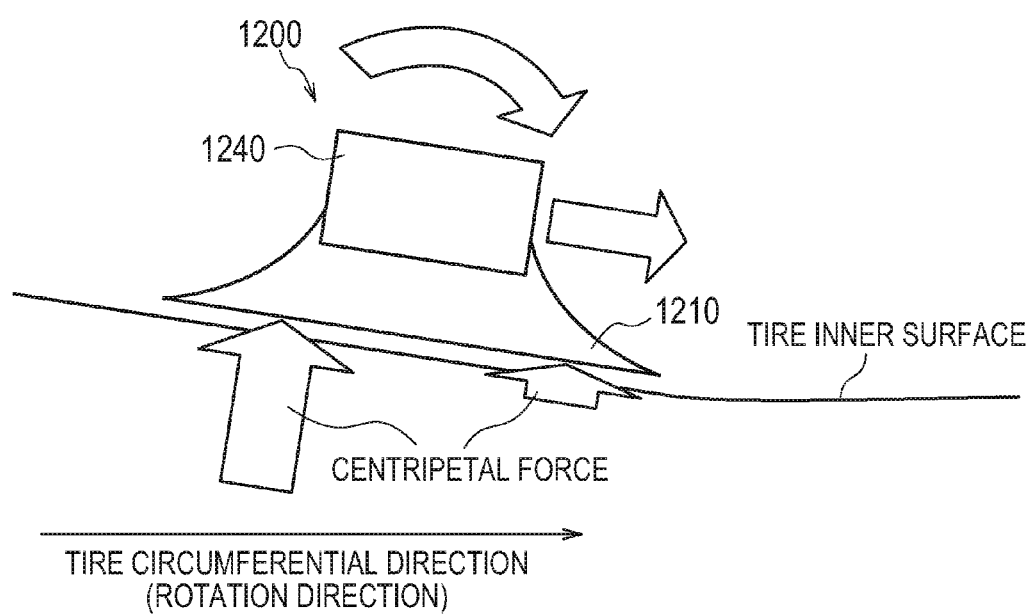
FIG. 42 is a diagram describing wobbling of a function component 1240 according to a second modification.

Hereinafter, the wobbling of the function component according to the second modification will be described. FIG. 42 is a diagram describing wobbling of a function component 1240 according to a second modification. It is noted that in FIG. 42, the frame 1220 and the base 1230 are omitted for the sake of simplicity.

As shown in FIG. 42, when the tire 100 comes into contact with the road surface in a state where the attachment structure 1200 is bonded to the inner surface of the tire 100, the centripetal force generated along with the rotation of the tire 100 differs depending on each region of attachment structure 1200.

Specifically, a case is considered where in the tire circumferential direction (rotation direction), the tire 100 corresponding to a front portion of the attachment structure 1200 comes into contact with the road surface and the tire 100 corresponding to a rear portion of the attachment structure 1200 does not come into contact with the road surface. In such a case, the centripetal force in the front portion of the attachment structure 1200 is smaller than the centripetal force in the rear portion of the attachment structure 1200. Therefore, in the tire circumferential direction (rotation direction), a stress that fells forward the attachment structure 1200 is applied.

Similarly, a case is considered where in the tire circumferential direction (rotation direction), the tire 100 corresponding to the front portion of the attachment structure 1200 does not come into contact with the road surface and the tire 100 corresponding to the rear portion of the attachment structure 1200 comes into contact with the road surface. In such a case, the centripetal force in the rear portion of the attachment structure 1200 is smaller than the centripetal force in the front portion of the attachment structure 1200. Therefore, in the tire circumferential direction (rotation direction), a stress that fells backward the attachment structure 1200 is applied.

When the stress that fells backward and forward the attachment structure 1200 is applied repeatedly to the attachment structure 1200 along with the rotation of the tire 100, behavior in which the attachment structure 1200 wobbles the neck back and forward is generated.

The attachment structure 1200 according to the second modification has a configuration described below, in order to ensure a sufficient rigidity relative to such behavior.
(Configuration of Attachment Structure)

Figure 43:
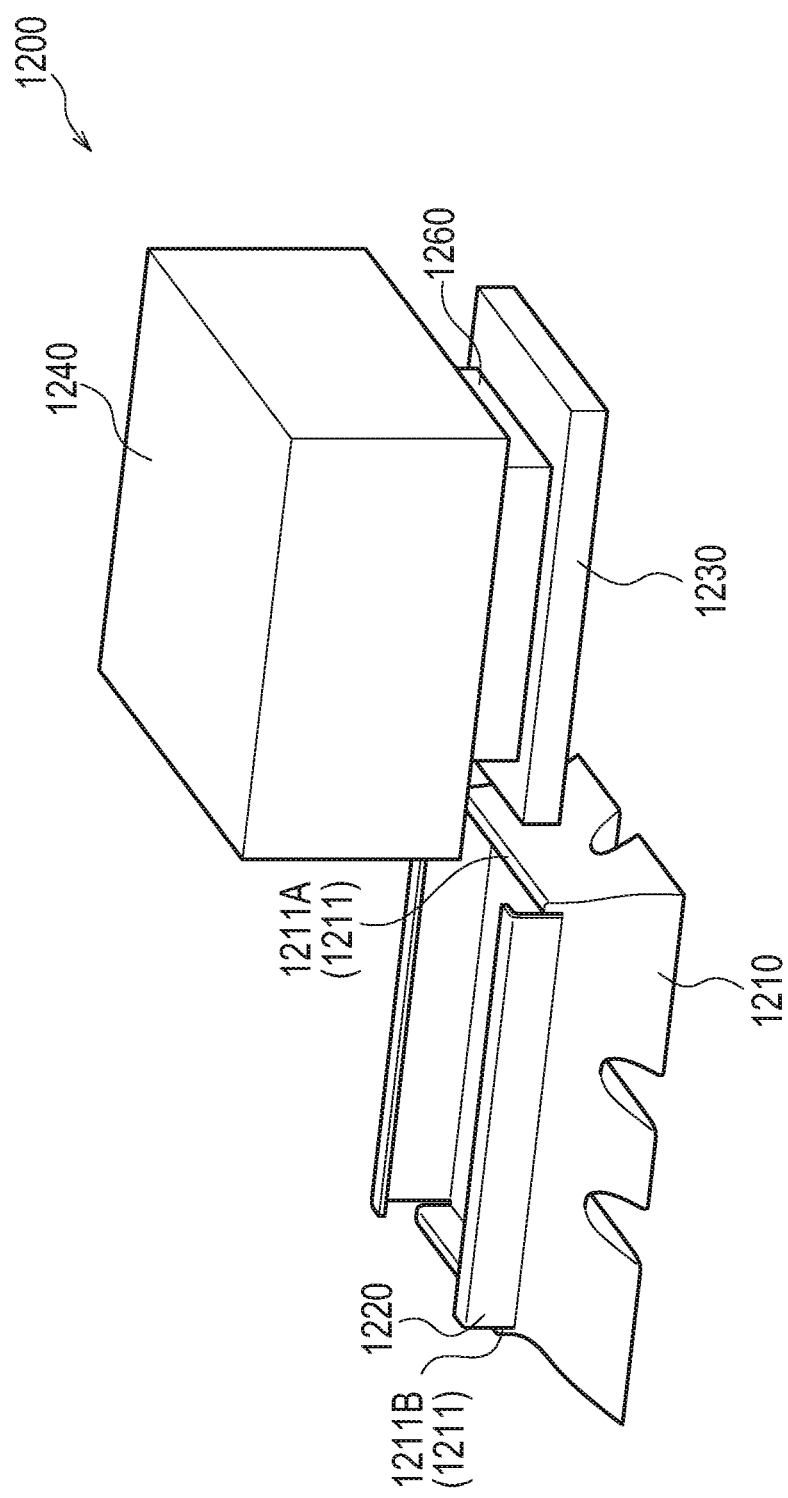
FIG. 43 is a diagram illustrating the attachment structure 1200 according to the second modification.

The configuration of the attachment structure according to the second modification of the second embodiment will be described, below. FIG. 43 is a diagram illustrating the attachment structure 1200 according to the second modification of the second embodiment.

As shown in FIG. 43, the attachment structure 1200 includes a neck 1260 in addition to the configuration shown in FIG. 34.

In the tire circumferential direction, the size of the neck 1260 is smaller than the sizes of the base 1230 and the function component 1240. It is noted that the neck 1260 may be regarded as a part of the base 1230 and as a part of the function component 1240.

As shown in FIG. 44, in the tire radial direction, $H_{1260}$ denotes the height of the neck 1260. In the tire radial direction, $T_{1223}$ denotes the thickness of the lateral wall engagement piece 1223.

Herein, the lateral wall engagement piece 1223 is curved at a location of the neck 1260, and placed between the base 1230 and the function component 1240. The height $H_{1260}$ of the neck 1260 preferably is equal to the thickness $T_{1223}$ of the lateral wall engagement piece 1223. As a result, the function component 1240 serves a function of pressing the lateral wall engagement piece 1223, and thus, it is possible to ensure a sufficient rigidity for the above-described wobbling. In other words, it is possible to restrain the lateral wall engagement piece 1223 from being lifted up in the tire radial direction and spreading to outside in the tire circumferential direction.

[Other Embodiment According to Second Embodiment]

The present invention is explained through the above-described second embodiment, but it must not be understood that this invention is limited by the statements and the drawings constituting a part of this disclosure. From this disclosure, various alternative embodiments, examples, and operational technologies will become apparent to those skilled in the art.

In the second embodiment, an example where the attachment structure 1200 is bonded to the tire 100, where the first direction is the tire widthwise direction, is described. However, the embodiment is not limited thereto. The attachment structure 1200 may be bonded to the tire 100 so that the second direction is the tire circumferential direction. In such a case, the first direction is the tire circumferential direction and the second direction is the tire widthwise direction.

In the second embodiment, as a dimensional expression, a term of "equal to" was used; naturally, it is possible to accept a dimension error.

It should be noted that the "predetermined rigidity" used in the second embodiment is at least larger than the rigidity of a member (elastic member) configuring the pedestal.

In the second embodiment, the shape of the frame upper surface of the frame 220 is rectangular. However, the embodiment is not limited thereto. Specifically, the shape of the frame upper surface of the frame 1220 may be triangular or another shape.

In the second embodiment, although the shapes of the pedestal lower surface and the pedestal inclined surface of the pedestal 1210 are not described in detail; however, the shapes may be formed in much the same way as the pedestal lower surface 211 and the pedestal inclined surface 213 of the pedestal 210 according to the first embodiment.

As described above, naturally, it is possible to combine the configurations of the above-described first embodiment, second embodiment, and modifications, respectively, where appropriate.

INDUSTRIAL APPLICABILITY

As described above, the attachment structure according to the present invention is useful because it is possible to provide an attachment structure that enables restraining of detachment from an inner surface of a tire.

The invention claimed is:

1. An attachment structure that attaches a function component having a function of detecting a state of a tire to an inner surface of the tire, comprising:
    a pedestal formed of an elastic member, and including a pedestal lower surface bonded to the inner surface of the tire, and a pedestal upper surface arranged opposite the pedestal lower surface, wherein
    the pedestal lower surface having a shape such that, if the pedestal was not bonded to the tire, the pedestal lower surface would be recessed toward a center of the pedestal in a cross section along a tire circumferential direction,
    a frame having a bottom plate formed of a member having a predetermined rigidity and having a frame lower surface placed on the pedestal upper surface and a frame upper surface arranged opposite the frame lower surface; and
    a base which is formed of a member having a predetermined rigidity and on which the function component is mounted, wherein
    the frame upper surface is defined by a first direction and a second direction crossing the first direction,
    the frame includes, on the frame upper surface, a pair of first-direction lateral walls extending along the first direction and standing upright in a vertical direction relative to the frame upper surface,
    the base is placed on the frame upper surface so as to be fit between the pair of first-direction lateral walls,
    the pedestal includes a pair of protrusions extending along the second direction and arranged with an interval in the first direction, and the frame is placed to be fit between the pair of protrusions in the first direction, and wherein the base includes a pair of groove portions extending along the second direction and arranged with an interval in the first direction, and the base is placed in the pedestal so that the pair of protrusions are fit to the pair of groove portions.

2. The attachment structure according to claim 1, wherein the pedestal lower surface is bonded in a deformed shape to the inner surface of the tire in the cross section along the tire circumferential direction.

3. The attachment structure according to claim 1, wherein:

each lateral wall of the pair of first-direction lateral walls of the frame includes a respective lateral wall engagement piece that bends toward the other one of the first-direction lateral walls, as a vertical direction tip relative to the frame upper surface, the base includes, at both sides in the second direction, a pair of lateral walls extending along the first direction and standing upright in the vertical direction relative to the frame upper surface, a fitting member is placed to be fit between the lateral walls of the base placed on the frame upper surface and the lateral wall engagement pieces of the frame, the lateral walls of the base have an inclination relative to the first direction, and have the upper surface contacting the fitting member, and the fitting member has an inclination to run along the upper surface of the lateral walls of the base, and has a lower surface contacting the upper surface of the lateral walls of the base.

4. The attachment structure according to claim 1, wherein in the vertical direction relative to the frame upper surface, a depth of the pair of groove portions is smaller than a height of the pair of protrusions.

5. The attachment structure according to claim 1, wherein a neck is arranged between the function component and the base, each lateral wall of the pair of first-direction lateral walls includes a respective lateral wall engagement piece that bends toward the other one of the first-direction lateral walls, as a vertical direction tip relative to the frame upper surface, in an orthogonal direction relative to the first direction, a size of the neck is smaller than sizes of the function component and the base, and the lateral wall engagement pieces are curved at a location of the neck and fit between the function component and the base.

* * * * *